United States Patent
Wraback et al.

(10) Patent No.: US 11,342,131 B2
(45) Date of Patent: May 24, 2022

(54) ELECTRON ACCELERATION AND CAPTURE DEVICE FOR PRESERVING EXCESS KINETIC ENERGY TO DRIVE ELECTROCHEMICAL REDUCTION REACTIONS

(71) Applicant: U.S. Army Research Laboratory, Adelphi, MD (US)

(72) Inventors: Michael Wraback, Germantown, MD (US); Anand V. Sampath, Montgomery Village, MD (US); Paul Shen, Potomac, MD (US); Vijay S. Parameshwaran, Greenbelt, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 768 days.

(21) Appl. No.: 16/036,464

(22) Filed: Jul. 16, 2018

(65) Prior Publication Data
US 2019/0019627 A1   Jan. 17, 2019

Related U.S. Application Data

(60) Provisional application No. 62/533,333, filed on Jul. 17, 2017.

(51) Int. Cl.
*H01G 9/20* (2006.01)
*C25B 1/04* (2021.01)
(Continued)

(52) U.S. Cl.
CPC .............. *H01G 9/205* (2013.01); *C25B 1/04* (2013.01); *C25B 1/55* (2021.01); *C25B 11/051* (2021.01); *H01G 9/2054* (2013.01); *H01G 9/204* (2013.01)

(58) Field of Classification Search
CPC ...... H01G 9/205; H01G 9/2054; H01G 9/204; C25B 11/0405; C25B 1/003; C25B 1/04;
(Continued)

(56) References Cited

U.S. PATENT DOCUMENTS 3,271,198 A   9/1966   Windogradofff et al.
3,925,212 A   12/1975  Tchernev
(Continued)

OTHER PUBLICATIONS

Blair C. Connelly, et al., poster entitled "Polarization Enhanced Transport of Hot Carriers in Liquid/InGaN Semiconductor Junctions" displayed at 20th International Conference on Solid State Ionics (SSI-20) (Jun. 14-Jun. 19, 2015).
(Continued)

*Primary Examiner* — Nicholas A Smith
*Assistant Examiner* — Colleen M Raphael
(74) *Attorney, Agent, or Firm* — Eric B. Compton

(57) ABSTRACT

Disclosed is a semiconductor-liquid junction based photoelectrochemical (PEC) cell for the unassisted solar splitting of water into hydrogen and oxygen gas, the solar-driven reduction of $CO_2$ to higher-order hydrocarbons, and the solar-driven synthesis of $NH_3$. The disclosed system can employ a photocathode based upon wurtzite hexagonal semiconductors that can be tailored with proper band alignment for the redox potentials for water, $CO_2$ reduction, and $NH_3$ production, and with bandgap energy for maximum solar absorption. The design maximizes the carrier collection efficiency by leveraging spontaneous and piezoelectric polarization in these materials systems to generate hot electrons within the photocathode. These electrons have sufficient excess energy, preserved at a designed energy capture region, to overcome the kinetic overpotential (surface chemistry limitation) required for the reactions to occur at a high rate.

25 Claims, 33 Drawing Sheets

(51) Int. Cl.
  *C25B 1/55* (2021.01)
  *C25B 11/051* (2021.01)
(58) Field of Classification Search
  CPC ......... C25B 1/55; C25B 11/051; Y02E 60/36;
              Y02E 10/542; Y02P 20/133
  USPC ...................................... 205/340; 204/290.09
  See application file for complete search history.

(56) References Cited

U.S. PATENT DOCUMENTS

| | | | |
|---|---|---|---|
| 4,296,188 A * | 10/1981 | Hodes ...................... | H01G 9/20 |
| | | | 136/260 |
| 4,656,103 A | 4/1987 | Reichman et al. | |
| 4,927,721 A | 5/1990 | Gratzel et al. | |
| 5,394,005 A | 2/1995 | Brown et al. | |
| 5,670,798 A * | 9/1997 | Schetzina ............. | H01L 29/205 |
| | | | 257/101 |
| 7,956,369 B2 | 6/2011 | Reed et al. | |
| 7,992,528 B2 | 8/2011 | Guerra | |
| 8,030,120 B2 | 10/2011 | Deng | |
| 8,674,407 B2 * | 3/2014 | Ando ................... | H01L 29/4236 |
| | | | 257/192 |
| 8,840,772 B2 | 9/2014 | He | |
| 2012/0028141 A1 * | 2/2012 | Nomura .............. | H01M 14/005 |
| | | | 429/422 |
| 2012/0312353 A1 * | 12/2012 | Kusterer ................... | C25B 1/55 |
| | | | 136/249 |
| 2013/0105306 A1 * | 5/2013 | Sonoda ............... | C01B 13/0207 |
| | | | 204/242 |
| 2015/0325743 A1 * | 11/2015 | Mi ........................ | H01S 5/4025 |
| 2016/0273115 A1 * | 9/2016 | Mi ............................. | C25B 1/55 |
| 2017/0002471 A1 * | 1/2017 | Okamoto ................... | C25B 1/55 |
| 2017/0076875 A1 * | 3/2017 | Walukiewicz ............. | C25B 1/04 |

OTHER PUBLICATIONS

K. Aryal, et al. "Hydrogen generation by solar water splitting using p-InGaN photoelectrochemical cells," Appl. Phys. Lett. 96, May 21, 2010 (2010).
Oscar Khaselev, et al., "A Monolithic Photovoltaic-Photoelectrochemical Device for Hydrogen Production via Water Splitting" www.sciencemag.org Science pp. 425-427, vol. 280 Apr. 17, 1998.
Moses et al., "Band bowing and band alignment in InGaN alloys," Appl. Phys. Lett. 96, (2010) Feb. 19, 2008.
Waki, Ichitaro, et al. "Direct water photoelectrolysis with patterned n-GaN." Applied Physics Letters 91.9 (2007): 3519.
Walter et al., "Solar Water Splitting Cells" Chemn. Rev. 110, (2010) 6446.
Wraback et al., "Direction dependent band nonparabolicity effects on high-field transient electron transport in GaN", Appl. Phys. Lett., vol. 82,. 3674, 2003.
Connelly et al., "Time-resolved electroabsorption measurement of carrier velocity in inverted polarity InI-xGaxN/GaN heterostructures due to internal electric fields," Phys. Status Solidi C 11 , No. 3-4, 682-685 (2014) I DOI10.1002/pssc.201300681.
Goano et al., "Band structure nonlocal pseudopotential calculation of the Ill-nitride wurtzite phase materials system." Part I. Binary compounds GaN, AIN, and InN, J. Appl. Phys. 88, (2000) 6467.
Kazutaka Tomizawa, Numerical simulation of submicron semiconductor devices, Artech House, Incorporated, 1993, p. 181.
Wraback et al., "Time-resolved electroabsorption measurement of the transient electron velocity overshoot in GaN," Appl. Phys. Lett. 79, (2001) 1303.
Fujii, Katsushi, and Kazuhiro Ohkawa. "Bias-assisted H2 gas generation in HCl and KOH solutions using n-type GaN photoelectrode." Journal of The Electrochemical Society 153.3 (2006): A468-A471.
Fujii, Katsushi, and Kazuhiro Ohkawa. "Photoelectrochemical properties of p-type GaN in comparison with n-type GaN." Japanese journal of applied physics 44.7L (2005): L909.
Liu, Shu-Yen, et al. "Mn-doped GaN as photoelectrodes for the photoelectrolysis of water under visible light." Optics axpress 20.105 (2012): A678-A683.
Benton, J., J. Bai, and T. Wang. "Enhancement in solar hydrogen generation efficiency using a GaN-based nanorod structure." Applied Physics Letters 102.17 (2013): 173905.
Lin, Yan-Gu, et al. "Photoelectrochemical activity on Ga-polar and N-polar GaN surfaces for energy conversion." Optics express 22.101 (2014): A21-A27.
V. Narasimhan, N. Melosh, and Y. Cui, Poster entitled: "Optimization, Fabrication, and Characterization of NanoengineeredSurfaces for Photon-Enhanced Thermionic Emitters," (2012).
H. Shen and M. Dutta, "Franz-Keldysh oscillations in modulation spectroscopy," Journal of Applied Physics 78, 2151 (1995).
Y. Yang et al., "Semiconductor interfacial carrier dynamics via photoinduced electric fields," Science, 2015.
Seitz et al., "Modeling Practical Performance Limits of Photoelectrochemical Water Splitting Based on the Current State of Materials Research," The Chemistry of Energy Conversion and Storage, 1372-1385 (2014).
Sven Ruhle, "Tabulated values of the Shockley-Queisser Limit for Single Junction Solar Cells," Solar Energy 130 (2016) 139-147.
Bernardini et al., Spontaneous Polarization and Piezoelectric Constants of III-V Nitrides, Physical Review B, vol. 56, No. 16 (1997).
Romanov et al., Strain-Induced Polarization in Wurtzite III-nitride Semipolar Layers, Journal of Applied Physics 100, 023522 (2006).
S.-H. Park and S.-L. Chuang, "Crystal-orientation Effects on the Piezoelectric Field and Electronic Properties of Strained Wurtzite Semiconductors," Physical Review B, vol. 59 No. 7, 1999.
Nakamura et al., A Nitride Based Polarization-Engineered Photocathode for Water Splitting Without a P-type Semiconductor, Phys. Chem.Chem.Phys., 2014, 16, 15326.
Fan et al., "High Efficiency Solar-to-hydrogen Conversion on a Monolithically Integrated InGaN/GaN/Si Adaptive Tunnel Junction Photocathode," Nano Lett, 15 (4) 2721-2726 (2015).
D. Wang et al., "Water-level Photocatalytic Water Splitting on GaN Nanowire Arrays Grown by Molecular Beam Epitaxy," Nano Lett. 11, 2011, 2353-3257.
Trasatti, "The absolute electrode potential: an explanatory note (Recommendations 1986)," Pure & Appl. Chem., vol. 58, No. 7, pp. 955-966, 1986.
M. Wraback, et al., "Band Structure Effects on the Transient Electron Velocity Overshoot in GaN," Physica Status Solidi (b) (2001) 228(2):585-588.
Jia et al., "Solar water splitting by photovoltaic-electrolysis with a solar-to-hydrogen efficiency over 30%," Nature Communications, 7 (2016) 13237.
Bae et al., "The Polarity Effect on the Photoelectrochemical Properties of Ga- and N-Face Free-Standing GaN Substrate," J. J. Appl. Phys. 52 (2013) 08JN26.
X. Shen et al., "Photocatalytic Water Oxidation at the GaN (1010)-Water Interface," J. Phys. Chem. C 114 (2010) 13695.
Benck et al., "Designing Active and Stable Silicon Photocathodes for Solar Hydrogen Production Using Molybdenum Sulfide Nanomaterials," Advanced Energy Materials 4 (2014) 1400739.
Boettcher et al., "Photoelectrochemical Hydrogen Evolution Using Si Microwire Arrays," J. Am. Chem. Soc. 133 (2011) 1216.
Liu et al., "A Fully Integrated Nanosystem of Semiconductor Nanowires for Direct Solar Water Splitting," Nano Lett. 13 (2013) 2989.
King et al., "Surface electronic properties of n- and p-type InGaN alloys," Phys. Stat. Sol. (b) 245, (2008) 881.
Linic et al., "Plasmonic-metal nanostructures for efficient conversion of solar to chemical energy," Nature Materials 10, (2011) 911.
Mubeen et al., "An autonomous photosynthetic device in which all charge carriers derive from surface plasmons," Nature Nanotechnology 8, (2013) 247.
Shi et al., "Hot Electron of Au Nanorods Activates the Electrocatalysis of Hydrogen Evolution on MoS2 Nanosheets," J. Am. Chem. Soc. 137 (2015) 7365.
E. Yu et al, "Spontaneous and piezoelectric polarization effects in III-V nitride heterostructures," J. Vac. Sci. Technol. B 17(4), Jul./Aug. 1999.

(56) References Cited

OTHER PUBLICATIONS

B. Hardin, H. Snaith, and M. McGehee, "The renaissance of dye-sensitized solar cells," Nature Photonics, vol. 6, Mar. 2012.
A. Fujishima and K. Honda, "Electrochemical Photolysis of Water at a Semiconductor Electrode," Nature, vol. 238, 37-38 (1972).
A. J. Nozik, "Photochemical diodes," Appl. Phys. Lett. 30, 567 (1977).
Y. W. Chen et al., "Atomic layer-deposited tunnel oxide stabilizes silicon photoanodes for water oxidation," Nature Materials, vol. 10, Jul. 2011.
M. R. Shaner et al., "Photoelectrochemistry of core-shell tandem junction n-p+-Si/n-WO3 microwire array photoelectrodes," Energy Environ. Sci., 2014, 7, 779.
R.E. Jones et al, "Evidence for p-Type Doping of InN," Physical Review Letters, 96, 125505 (2006).
Y. Hikita et al, "Band Edge Engineering of Oxide Photoanodes for Photoelectrochemical Water Splitting: Integration of Subsurface Dipoles with Atomic-Scale Control," Advanced Energy Material, 2016, 6, 1502154.
V. Viswanathan et al., "Nanoscale Limitations in Metal Oxide Electrocatalysts for Oxygen Evolution," Nano Letters, 2014, 14, 5853-5857.

* cited by examiner

ELECTRON ACCELERATION AND CAPTURE DEVICE FOR PRESERVING EXCESS KINETIC ENERGY TO DRIVE ELECTROCHEMICAL REDUCTION REACTIONS

CROSS-REFERENCE TO RELATED APPLICATIONS

This application claims priority to U.S. Provisional Application 62/533,333, filed on Jul. 17, 2017.

STATEMENT OF GOVERNMENT INTEREST

The invention described herein may be manufactured, used, and/or licensed by or for the United States Government.

BACKGROUND

Electrochemical reduction reactions are present in a variety of industries, with a wide range of applications.

In photoelectrolysis of water, hydrogen gas is evolved under illumination through coupled oxidation reduction reactions given by

$$H_2O(l) + 2h^+ \rightarrow \tfrac{1}{2}O_2(g) + 2H^+ \quad \text{(OER)}$$

$$2H^+ + 2e^- \rightarrow H_2(g) \quad \text{(HER)}$$

A solid-state approach consists of selecting semiconductors for either/both the photocathode or/and the photoanode to provide the required electrons/holes to drive the hydrogen evolution reaction (HER) and oxygen evolution reaction (OER) respectively. During this process, the material surface maintains stability and is engineered to withstand long operation times in field-related applications without degradation. In the classical approach, band-bending at a doped semiconductor surface in contact with a liquid containing electrolyte at thermal equilibrium encourages the movement of photogenerated excess minority carriers to the surface where they enable the complementary redox reaction. For example, a p-type semiconductor is required as a photocathode to provide minority carrier electrons to drive the HER. The depletion of the semiconductor surface provides a negative space charge that sets up an internal electric field to promote the movement of photogenerated electrons to the surface. The choice of semiconductor is severely constrained by band alignment with the potentials for the HER/OER reactions, solar-spectrum absorption efficiency, as well as chemical stability within the reaction. These factors directly impact solar to hydrogen efficiency (STH) as well as reliability of the cell. For this application, a semiconductor must have a band gap greater than ~1.23 eV to drive the HER/OER reactions, and its conduction or valence band alignment must straddle the $H^+/H_2$ and $O_2/H_2O$ redox potentials, respectively. This energetics sets up the requirement that the semiconductor-electrolyte interface, in equilibrium, provides the appropriate band-bending for the corresponding reaction. In practice the kinetic limitations on the HER/OER reactions on a bare semiconductor surface generally requires a wider band gap semiconductor (>1.5 eV), as well as an additional overpotential to drive the reaction, resulting in a loss in $V_{oc}$ for the electrode and therefore lower efficiency. This overpotential is typically supplied via an external bias or through the use of a buried photovoltaic junction.

Photoelectrolytic semiconductor junctions have been explored in a number of material systems, but typically either the materials will corrode in solution and therefore cannot be directly coupled to the reactions of interest, or the energetics are unfavorable (such as having too wide a bandgap or requiring external bias, resulting in low efficiency). For much of the history in this field, metal oxides have been the primary choice due to their stability in aqueous solutions, despite having low charge transport (diffusion length) and light absorption (absorption coefficient) properties. Silicon and group III-V semiconductors were integrated with co-catalysts based on a buried photovoltaic junction, but with the emergence of III-Nitride semiconductors in the electronics and photonics industries, these materials have become ideal candidates.

An important limitation to previous III-Nitride based photoelectrolytic junctions is that the importance of carrier drift in the presence of defects has not been considered. Most other compound semiconductor systems can benefit from growth on lattice matched substrates resulting in low defect density and promoting longer carrier diffusion lengths, such as silicon and gallium arsenide. As a result, photogenerated carriers can be collected efficiently through diffusion. However, the lack of a lattice matched substrate for InGaN alloys at the required In/Ga mole fractions for this application results in the generation of defects that reduces the diffusion length in the InGaN light absorption region and therefore the efficiency that photogenerated carriers can be collected by this approach. In these situations, the photogenerated carrier collection efficiency is significantly reduced since electrons and holes must diffuse over a long distance to be collected by the front surface and rear contact respectively. Furthermore, this approach does not inherently address the kinetic limitations for the reactions to proceed at the surface that results in the overpotential requirement.

Therefore, an improved electrochemical reduction method that addresses the kinetic limitations is desirable.

SUMMARY OF THE INVENTION

The present disclosure is drawn to a photocathode capable of driving a redox reaction.

Disclosed is a photocathode that includes an electrical contact, a substrate region, a semiconducting region, a light absorption region, an electron acceleration region, and an energy capture region, having polarization vectors with specific characteristics. Advantageously, the total polarization vector of the light absorption region is greater than or the same as that of the semiconducting region, and in some embodiments where the two vectors are the same, the doping of the semiconducting region is at a larger concentration than the doping of the light absorption region. The total polarization vector of the electron acceleration region is greater than that of the light absorption region in order to create an electric field to accelerate electrons to achieve an elevated kinetic energy.

Further embodiments define a desirable liquid composition for reduction reactions, and substrate characteristics for generating desirable growth in the semiconductors. In some embodiments, the energy capture region has a greater total polarization vector than the electron acceleration region; in some of those embodiments, each region of the photocathode has an equal or larger bandgap than the preceding region. In other embodiments, the bandgap of each successive region has an equal or smaller bandgap than the preceding region except for the energy capture region, which has a larger bandgap but a smaller total polarization vector than the electron acceleration region, leading to a positive interface charge at the interface of the energy capture region and the electron acceleration region. Doping can be used to create negative space charge to enable the appropriate band bending to drive the reaction.

Advantageously, some semiconducting regions utilize an alloy having a wurtzite hexagonal crystal structure, including either a III-Nitride alloy or a II-VI alloy.

In particular embodiments, the photocathode is comprised of III-N alloys and may advantageously have a semiconducting region doped p-type with a density of Mg atoms between $1\times10^{19}$ cm$^{-3}$ and $1\times10^{22}$ cm$^{-3}$ and the light absorption region, electron acceleration region, and energy capture region doped p-type with a density of Mg atoms between $1\times10^{15}$ cm$^{-3}$ and $1\times10^{20}$ cm$^{-3}$.

In particular embodiments, the photocathode is configured such that the semiconducting region has a free hole concentration greater than $1\times10^{17}$ cm$^{-3}$, and more preferably between $1\times10^{17}$ cm$^{-3}$ and $1\times10^{21}$ cm$^{-3}$ and the light absorption region, electron acceleration region, and energy capture region have a free hole concentration less than $1\times10^{18}$ cm$^{-3}$, and more preferably between $1\times10^{13}$ cm$^{-3}$ and $1\times10^{18}$ cm$^{-3}$.

In particular embodiments, the total polarization vector of the light absorption region $P_2$ is the same as the first total polarization vector $P_1$ of the semiconducting region, but the p-type doping of the semiconducting region is larger than that of the light absorption region such that the junction formed has a depleted light absorption region adapted to sustain an electric field such that photogenerated holes are collected by drift and diffusion at the contact and photogenerated electrons in the light absorption region are collected by drift at the second interface between the light absorption region and the electron acceleration region.

In particular embodiments, the polarization vector of the light absorption region is greater than the polarization vector of the semiconducting region to create a polarization-induced electric field within the light absorption region such that holes are collected by drift at the contact and electrons are collected by drift in the electron acceleration region.

In other embodiments, the semiconducting region is comprised of In$_x$Ga$_{1-x}$N with a thickness in the range of 100 nm to 1000 nm and with x in the range of 0.2 to 0.22, the light absorption region is comprised of In$_{0.2}$Ga$_{0.8}$N with a thickness in the range of 100 nm to 300 nm, the electron acceleration region is comprised of In$_{0.18}$Ga$_{0.82}$N with a thickness in the range of 50 nm to 100 nm, and the energy capture region is comprised of In$_x$Ga$_{1-x}$N with x in the range of 0 to 0.16 and thickness in the range 5 nm to 100 nm.

Advantageously, the substrate may be doped p-type and the contact to the semiconducting region may be formed through the substrate.

In particular embodiments, the substrate is n-type GaN and the contact to the semiconducting region is formed through the substrate using a tunnel junction comprised of a GaN region adjacent to the n-type GaN substrate doped n-type with a density of Si atoms between $1\times10^{10}$ cm$^{-3}$ and $1\times10^{22}$ cm$^{-3}$, an InN region with thickness in the range of 1 to 3 nm, and the first semiconducting region doped p-type with a density of Mg atoms between $1\times10^{20}$ cm$^{-3}$ and $1\times10^{22}$ cm$^{-3}$.

In particular embodiments, the photocathode is comprised of III-N alloys and the semiconducting region is doped p-type with a density of Mg atoms between $1\times10^{10}$ cm$^{-3}$ and $1\times10^{22}$ cm$^{-3}$, and the light absorption region and electron acceleration region are doped p-type with a density of Mg atoms between $1\times10^{15}$ cm$^{-3}$ and $1\times10^{20}$ cm$^{-3}$.

In particular embodiments, the photocathode is configured such that the semiconducting region has a free hole concentration greater than or equal to $1\times10^{17}$ cm$^{-3}$, and more preferably between $1\times10^{17}$ cm$^{-3}$ and $1\times10^{21}$ cm$^{-3}$, and the light absorption region and electron acceleration region have free hole concentrations less than or equal to $1\times10^{18}$ cm$^{-3}$, and more preferably between $1\times10^{13}$ cm$^{-3}$ and $1\times10^{18}$ cm$^{-3}$.

In particular embodiments, the energy capture region is comprised of a III-N alloy and is doped p-type with a density of Mg atoms between $1\times10^{10}$ cm$^{-3}$ and $1\times10^{22}$ cm$^{-3}$ and has a thickness such that the negative charge distribution from the ionized acceptor dopant atoms compensates the positive interface charge at the interface due to the total polarization vector of the energy capture region $P_4$ being less than that of the electron acceleration region $P_3$, forming a potential variation that allows carriers to move from the energy capture region to the liquid.

In particular embodiments, the energy capture region is configured to have a free hole concentration between greater than $1\times10^{17}$ cm$^{-3}$, and more preferably between $1\times10^{17}$ cm$^{-3}$ and $1\times10^{21}$ cm$^{-3}$.

In particular embodiments, the semiconducting region is comprised of In$_x$Ga$_{1-x}$N with x in the range of 0 to 0.2 and a thickness in the range of 100 nm to 1000 nm, the light absorption region is comprised of In$_{0.2}$Ga$_{0.8}$N with a thickness in the range of 100 nm to 300 nm, the electron acceleration region is comprised of In$_{0.22}$Ga$_{0.78}$N with a thickness in the range of 50 nm to 100 nm, and the energy capture region is comprised of In$_x$Ga$_{1-x}$N with x in the range of 0 to 0.18 and thickness in the range 10 nm to 100 nm.

The disclosed photocathode may advantageously include a substrate that is doped p-type and the contact to the semiconducting region is formed through the substrate. In some embodiments, the substrate is n-type GaN and the contact to the semiconducting region is formed through the substrate using a tunnel junction comprised of a GaN region adjacent to the n-type GaN substrate doped n-type with a density of Si atoms between $1\times10^{19}$ cm$^{-3}$ and $1\times10^{22}$ cm$^{-3}$, an AlN region with thickness in the range of 1 to 3 nm, and the semiconducting region doped p-type with a density of Mg atoms between $1\times10^{20}$ cm$^{-3}$ and $1\times10^{22}$ cm$^{-3}$.

Advantageously, the disclosed photocathode may also include a co-catalyst.

Also disclosed is a photoelectrolysis system comprising a photocathode and a counter electrode that serves as the anode for the counter-reaction.

Also disclosed is a method of controlling an electrochemical reduction reaction using the photoelectrode, involving illuminating the light absorption region to generate electrons which are accelerated above the potential energy in the conduction band of the energy capture region, which enables the energy capture region to utilize the excess energy for driving a reduction reaction at a photocathode-liquid junction.

Figure 1:
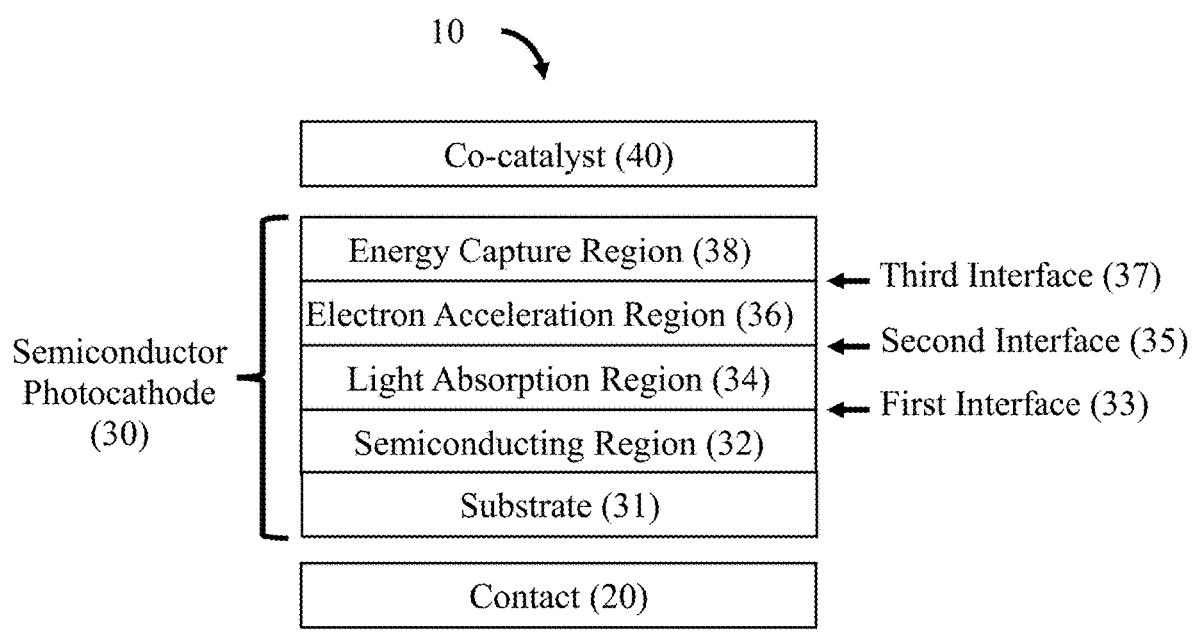
FIG. 1 is a schematic of one embodiment of a photocathode.

A more complete appreciation of the invention will be readily obtained by reference to the following Detailed Description. The representations in each of the figures are diagrammatic and no attempt is made to indicate actual scales or precise ratios.

DETAILED DESCRIPTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skilled in the art to practice the embodiments of the invention. Accordingly, the examples should not be construed as limiting the scope of the embodiments of the invention.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region or object illustrated as a rectangular will, typically, have tapered, rounded or curved features. Thus, the regions illustrated in the figures are schematic in nature and their shapes are not intended to illustrate the precise shape of a region of a device and are not intended to limit the scope of the present invention.

It will also be appreciated by those of skill in the art that references to a structure or feature that is disposed "adjacent" another feature may have portions that overlap or underlie the adjacent feature.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3A:
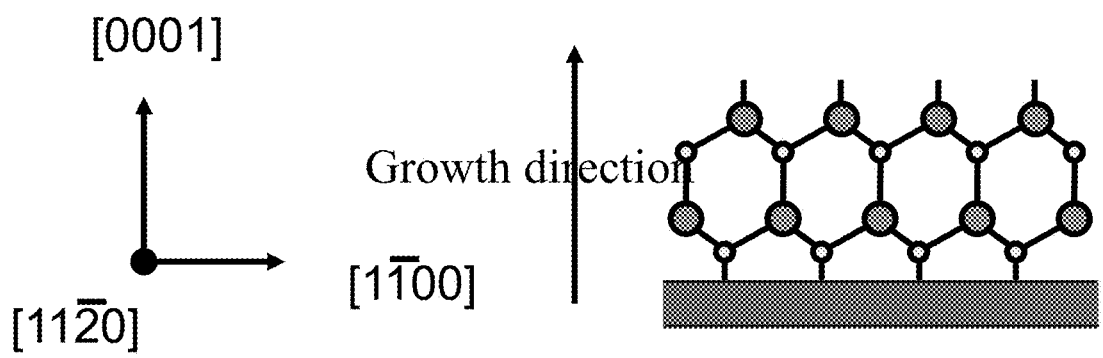
FIGS. 3A and 3B are schematics of embodiments of the III-polar and V-polar growth directions, respectively, in wurtzite semiconductors
Figure 3B:
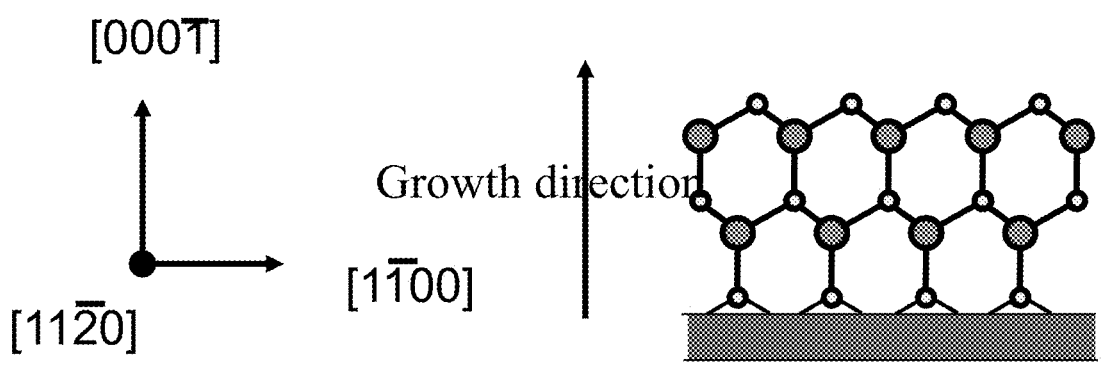

As used herein, the term "polarity" refers to two different sequences of the atomic layering in the two opposing directions parallel to certain crystallographic axes are exhibited in a noncentrosymmetric compound crystal. For binary A-B compounds with wurtzite structure, the sequence of the atomic layers of the constituents A and B is reversed along the [0001] and [000-1] directions. The corresponding (0001) and (000-1) faces are the A-face and B-face, respectively. The atoms are arranged in bilayers in the planes; these bilayers consist of two closely spaced hexagonal layers, one formed by cations and the other formed by anions, leading to polar faces. For example, GaN can have two different polarities, a Ga-polar face and an N-polar face as shown in FIGS. 3A and 3B, respectively, normal to the {0001} basal plane. A Ga-polar face means that Ga is on the top position of the {0001} bilayer, corresponding to the [0001] polarity, and a N-polar face means that N is on the top position of the {0001} bilayer, corresponding to [000-1] polarity.

The term "Group II-polar" as used in the following claims, means that a Group II element is on the top position of the {0001} bilayer described previously, corresponding to the [0001] polarity, and a Group VI element is on the bottom position of the {0001} bilayer, as shown in FIG. 3A. The Group II atoms can be zinc, manganese, cadmium or a combination of the above. Group VI can be oxygen, sulfur, selenium, tellurium, or combinations of these.

The term "Group III-polar" as used in the following claims, means that a Group III element is on the top position of the {0001} bilayer described previously, corresponding to the [0001] polarity, and a Group V element is on the bottom position of the {0001} bilayer, as shown in FIG. 3A. The Group III atoms can be aluminum, indium, gallium, boron, or combinations thereof; and Group V can be nitrogen, arsenic, phosphorous, antimony, or combinations of these.

The term "Group VI-polar" as used in the following claims, means that a Group VI element is on the top position of the {0001} bilayer described previously, corresponding to the [000-1] polarity, and a Group II element is on the bottom position of the {0001} bilayer, as shown in FIG. 3B. The Group II atoms can be zinc, manganese, cadmium or a combination of the above. Group VI can be oxygen, sulfur, selenium, tellurium, or combinations of these.

The term "Group V-polar" as used in the following claims, means that a Group V element is on the top position of the {0001} bilayer described previously, corresponding to the [000-1] polarity, and a Group III element is on the bottom position of the {0001} bilayer, as shown in FIG. 3b. The Group III atoms can be aluminum, indium, gallium, boron, or combinations thereof; and Group V can be nitrogen, arsenic, phosphorous, antimony, or combinations of these.

Figure 4:
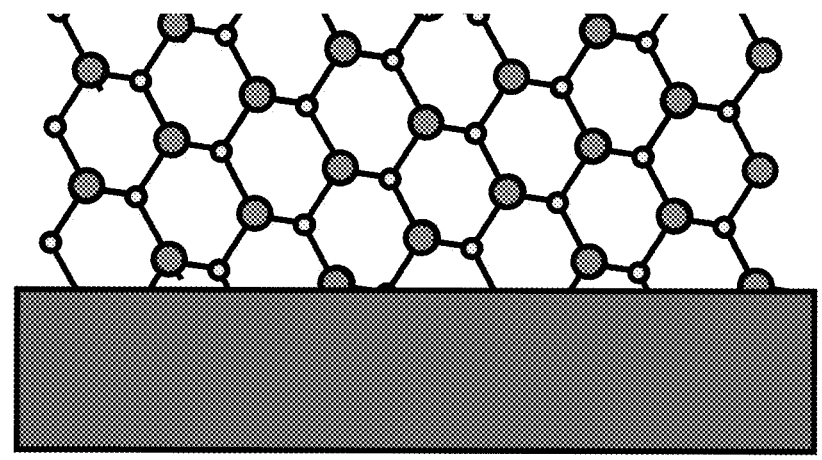
FIG. 4 is a schematic of an embodiment of a wurtzite structure grown along a semi polar direction

The term "semipolar template" means a template whose outward growth direction is not perpendicular or parallel to the polar axis of the template. FIG. 4 shows an example of a wurtzite structure grown along a semi polar direction.

The term "group II-polarity template" means a group II-polar template or a semipolar template with the angle between the outward growth direction and the group II-polar direction less than 90 degrees tilt from the c-plane (0001) direction.

The term "group III-polarity template" means a group III-polar template or a semipolar template with the angle between the outward growth direction and the group III-polar direction less than 90 degrees tilt from the c-plane (0001) direction.

The term "group V-polarity template" means a group V-polar template or a semipolar template with the angle between the outward growth direction and the group V-polar direction less than 90 degrees tilt from the c-plane (000-1) direction.

The term "group VI-polarity template" means a group VI-polar template or a semipolar template with the angle between the outward growth direction and the group VI-polar direction less than 90 degrees tilt from the c-plane (000-1) direction.

The term "total polarization" is the projection of the vector sum of the spontaneous polarization and the piezoelectric polarization on the spontaneous polarization direction.

The term "template" includes a buffer layer on a substrate or only a substrate without a buffer.

The term "photogenerated" refers to the process of an absorbed photon exciting an electron from the valence band into the conduction band of a semiconductor, leaving behind a hole. The electron and the hole are free to move spatially in the conduction and valence bands, respectively.

The terminology "quasi-neutral" is defined as a region whose total charge is zero Coulombs; that is, it is electrically neutral through summation of the charge present in the volume of that region.

The term "acute angle" is defined as less than 90 degrees angular tilt from the original position. As can be seen by looking at the axes in FIGS. 3A and 3B, going beyond 90 degrees for a nominally III-polar photocathode will transition into an acute angle for a nominally V-polar photocathode. Likewise, going beyond 90 degrees for a nominally V-polar photocathode will transition into an acute angle for a nominally III-polar photocathode.

The terminology "solar spectrum" is the solar spectral irradiance on a surface. Typically, this is depicted as the irradiance flux of light as a function of its wavelength, and standards have been developed, including, for example, ASTM G173 spectra. By adjusting the bandgap energy of the light absorption, the amount of spectral irradiance absorbed, and the energy of the photogenerated carriers, will vary. All light with wavelength shorter than the emission wavelength of the material will be absorbed.

The terminology "light" is the electromagnetic spectrum including infrared, visible, and/or ultraviolet spectra. It may encompass the spectral range with wavelengths of about 200-2500 nm or any portion thereof, for example.

Reference is made to FIG. 1, which discloses one embodiment of a photocathode (10). In this embodiment, the photocathode (10) includes a contact portion (20), a semiconductor photocathode portion (30), and optionally a co-catalyst portion (40).

The contact (20) as shown here is a conductive material that provides an ohmic contact for the photocathode, and to collect carriers, and specifically to collect holes generated during the light absorption process. Many conductive materials may be utilized as a contact. In some embodiments, contact (20) comprises indium metal.

In some embodiments, such as those shown in FIG. 1, the contact (20) is connected to the back side of either an optional substrate (31) or directly with a semiconducting region (32). In some embodiments, the contact (20) is configured to extend across substantially all of one interface with an optional substrate (31), or across substantially all of one interface with semiconducting region (32).

Figure 2A:
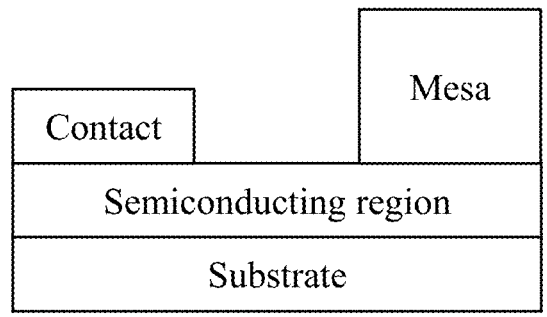
FIGS. 2A and 2B are schematics of alternative embodiments of the contacting scheme to the semiconducting region.
Figure 2B:
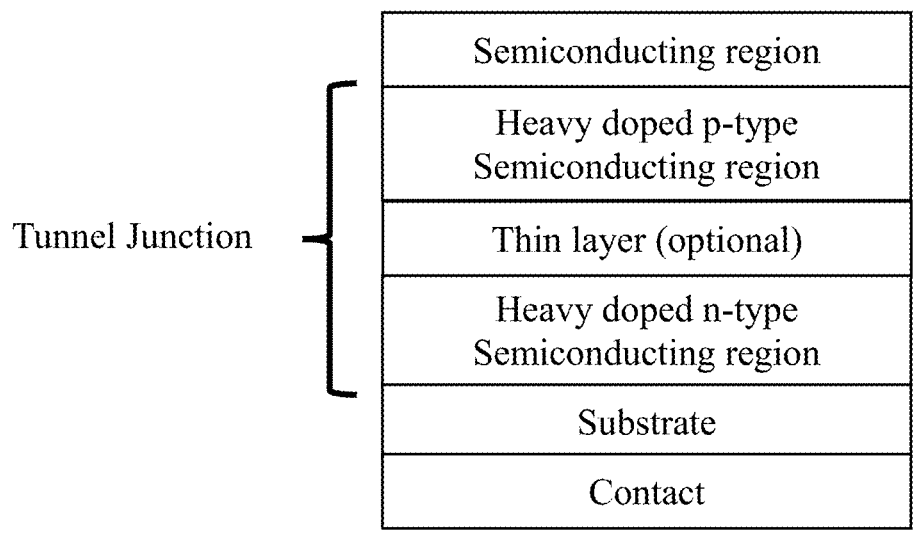

FIGS. 2A and 2B illustrate the two alternate contacting schemes. A mesa structure, such as that shown in FIG. 2A, may be required when using certain optional template substrates (31), such as GaN-on-sapphire. In FIG. 2A, the mesa structure and the contact are connected through the semiconducting region. FIG. 2B depicts a tunnel junction which may be required for avoiding overpotential loss within a p-n junction, typically encountered in the III-Nitride materials systems. In FIG. 2B, there the semiconducting region is adjacent a tunnel junction enabling contact to the p-type semiconducting through an n-type substrate or template. The tunnel junction consists of a heavy doped p-type semiconducting region, which is adjacent to a heavy doped n-type semiconducting region, which is adjacent to an optional substrate, which is adjacent to a contact. The tunneling can be enhanced by exploiting the polarization of the tunnel junction through incorporation of a suitable optional thin layer. As non-limiting examples, in a III-polar material configuration, an AlN thin layer may be utilized, while in a V-polar material configuration, an InN thin layer may be utilized.

Referring back to FIG. 1, the semiconductor photocathode (30) is comprised of several regions.

The first region is a semiconducting region (32), which is configured to be connected in some fashion to the contact, as described previously. The semiconducting region (32) is configured to have a total polarization vector $P_1$ and is operatively associated with the contact.

In some embodiments, the semiconducting region is comprised of an alloy having a wurtzite hexagonal crystal structure, and preferably the alloy comprising either (i) In, Al, and Ga combined with N (a III-Nitride alloy) or (ii) Mg, Zn, or Cd combined with O, S, Se, or Te (a II-VI alloy). Wurtzite nitride heterostructures grown along the [0001] direction possess strong built-in electric fields due to the interface charge associated with the termination of large spontaneous and piezoelectric polarizations at the heterointerfaces ($\sigma=10^{12}$-$10^{13}$ charges/cm$^2$ or ~$10^{-2}$-$10^{-3}$ C/m$^2$).

Embodiments of growth directions for a wurtzite crystal structure can be seen in FIGS. 3A and 3B. FIG. 3A is a graphical representation of a Group II-polar and Group III-polar surface with respect to the growth direction for a wurtzite crystal structure, which is common for III-V and II-VI polar compound semiconductors. FIG. 3A illustrates an example of growth along the [0001] direction of the wurtzite crystal structure for group II or group III-polar layers.

FIG. 3B is a graphical representation of a Group V-polar and Group VI-polar surface with respect to the growth direction for a wurtzite crystal structure, which is common for III-V and II-VI polar compound semiconductors. FIG. 3B illustrates an example of growth along the direction of the wurtzite crystal structure for group V or group VI-polar layers.

FIG. 4 shows an example of a wurtzite structure grown along a semi polar direction. FIG. 4 illustrates the growth direction with respect to the polarity of the growth surface. FIG. 4 illustrates an example of the growth and the polar orientations of III-V or II-VI compound semiconductors with a wurtzite crystal structure.

The second region is a light absorption region (34), adjacent to the semiconducting region (32). The light absorption region (34) forms a first interface (33) with the semiconducting region (32). The light absorption region (34) has a total polarization vector $P_2$, absorbs photons to create electron-hole pairs.

The motion of charge carriers in the light absorption region may be either: diffusion through a carrier concentration gradient, drift in an electric field set up by interface charge due to the discontinuity in total polarization vector (i.e., polarization charge) at the semiconducting/light absorption interface (i.e., first interface 33), or drift through variation in doping between the semiconducting region and the light absorption region, e.g., p-type doping with Mg atoms.

For the disclosed photocathode, the total polarization charge at a heterointerface σ is derived from piezoelectric and spontaneous tensors of the polar semiconductor device structure.

In some embodiments, $P_2$ is greater than $P_1$. This will form a negative polarization charge at the first interface (33), creating an electric field that depletes the light absorption region (34) such that holes are collected by drift and diffusion at the contact (20) and electrons are collected from the light absorption region by drift into the electron acceleration region (36).

In some embodiments, $P_2$ is the same as $P_1$ and has the same doping, forming a junction that is quasi-neutral. In these embodiments, holes are collected by diffusion at the contact (20) and electrons are collected by diffusion from the light absorption region into the electron acceleration region (36). Alternatively, in embodiments where $P_2$ is the same as $P_1$, the semiconducting region (32) is doped at a larger concentration than the light absorption region (34), and a junction is formed that has a depleted light absorption region adapted to sustain an electric field such that holes are collected by drift and diffusion at the contact (20) and electrons are collected by drift from the light absorption region into the electron acceleration region (36).

The third region is an electron acceleration region (36), adjacent to the light absorption region (34). The electron acceleration region (36) forms a second interface (35) with the light absorption region (34). The electron acceleration region has a total polarization vector $P_3$ that is greater than $P_2$, such that a negative polarization charge is formed at the second interface (35). This creates an electric field that can accelerate electrons within the electron acceleration region away from the second interface, towards the energy capture region (38).

Figure 15A:
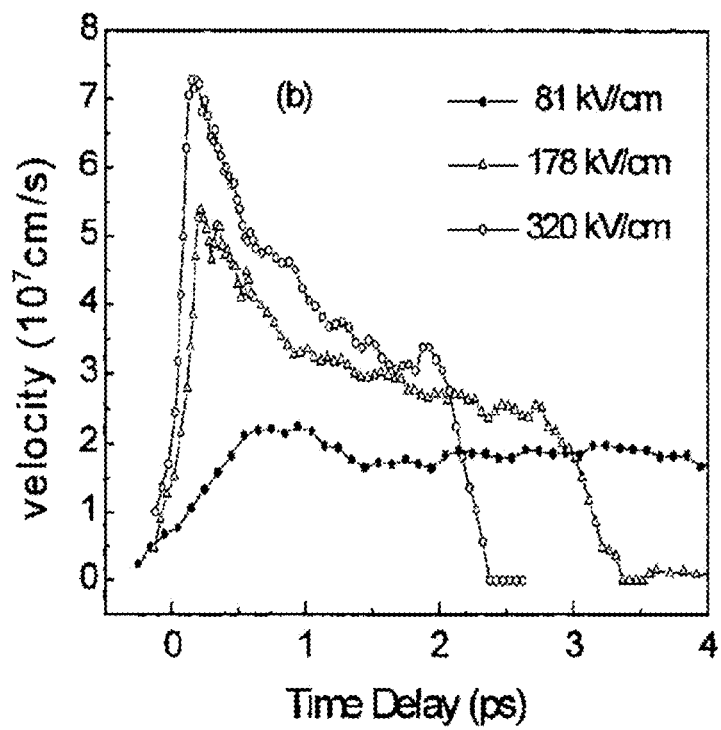
FIG. 15A is a graph of the velocity that an electron obtains in the c-plane direction as a function of time under different electric fields.
Figure 15B:
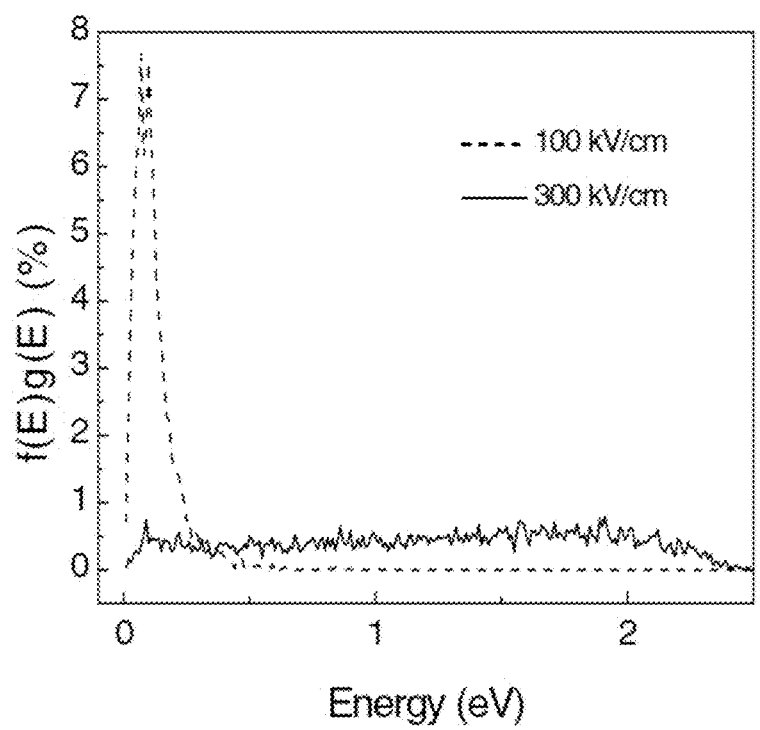
FIG. 15B is a graph of the density distribution of electrons with respect to kinetic energy that is obtained for transport in the c-plane direction under different electric fields.

The transient velocity and kinetic energy distribution of the electrons within an electron acceleration region is characterized by FIGS. 15A and 15B, with the transient velocity overshoot beyond the steady-state velocity accounted for. FIG. 15A shows the velocity that an electron obtains in the c-plane direction for different applied electric fields. FIG. 15B shows the number distribution of electrons with respect to kinetic energy that is obtained in the c-plane direction under different applied electric fields. It should be noted that the electric field for which the measurements and calculations were done in FIGS. 15A and 15B were not created by engineering of the polarization in various layers of the structure, but rather by using reverse biased pin diodes, as determined using reverse biased pin diodes. See Wraback, M et al., "Band Structure Effects on the Transient Electron Velocity Overshoot in GaN", Physica Status Solidi (b) (2001) 228(2):585-588. DOI: 10.1002/1521-3951(200111)228:2<585::AID-PSSB585>3.0.CO;2-Z.

The fourth region is an energy capture region (38), adjacent to the electron acceleration region (36). The energy capture region (38) forms a third interface (37) with the electron acceleration region (36). The energy capture region has a total polarization vector $P_4$. Further, the energy capture region (38) is configured to have a bandgap larger than the bandgap of the electron acceleration region, such that the potential energy of the conduction band of the energy capture region (38) is larger than the potential energy of the conduction band of the electron acceleration region (36).

Additionally, the interface charge at the third interface (37) and the space charge in the energy capture region (38) in some embodiments are engineered such that the depletion within the energy capture region has the electric field to move the electrons within the energy capture layer towards the liquid.

The term "junction" refers to electrical contact made between two regions such that the chemical potential (also defined as Fermi level), previously different in the two regions, reaches the same value in both, and thus is at thermal equilibrium through free carrier motion across the two regions.

Figure 11A:
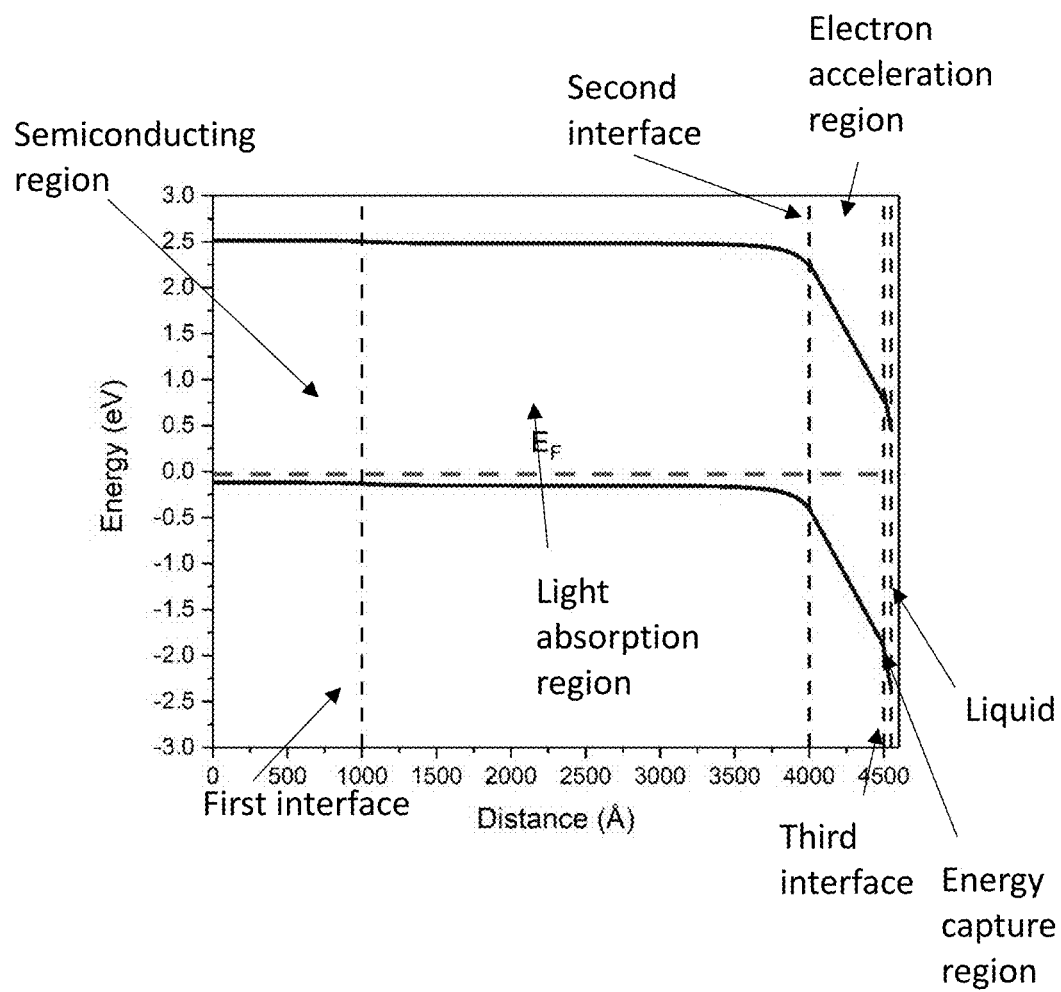
FIGS. 11A and 11B are illustrations of an energy band diagram for the embodiment in FIG. 10 of a photocathode in contact with the reduction potential of hydrogen in aqueous electrolyte.
Figure 11B:
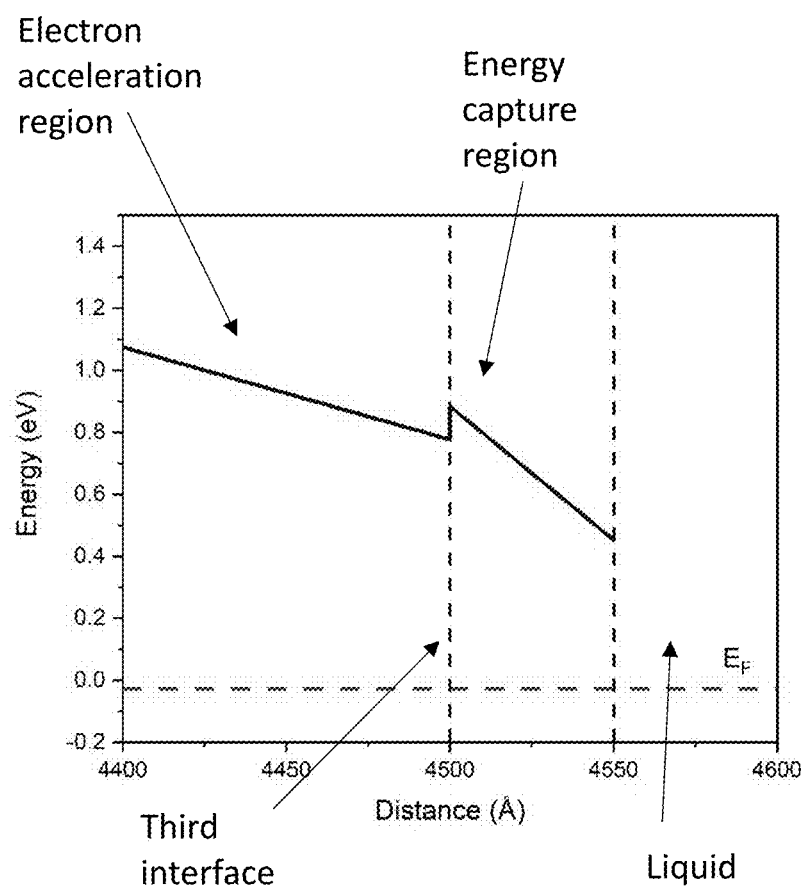
Figure 11C:
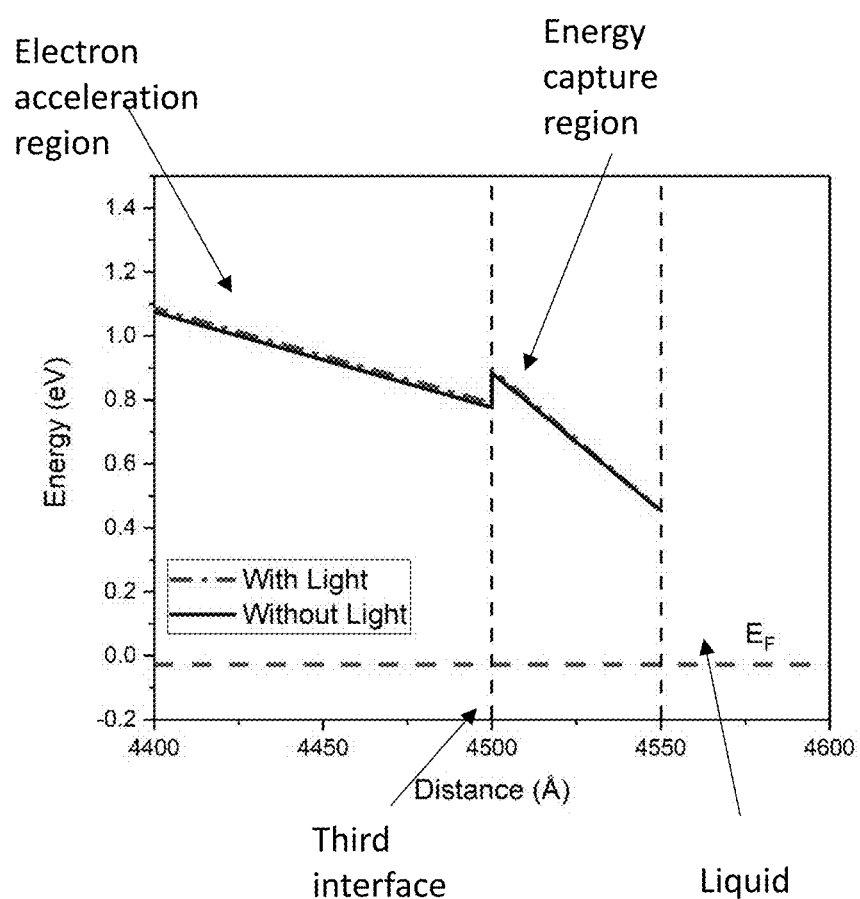
FIG. 11C is an illustration of an energy band diagram both with and without an optical bias of 100 mW/cm$^2$ for the embodiment in FIG. 10 of a photocathode in contact with the reduction potential of hydrogen in aqueous electrolyte.
Figure 11D:
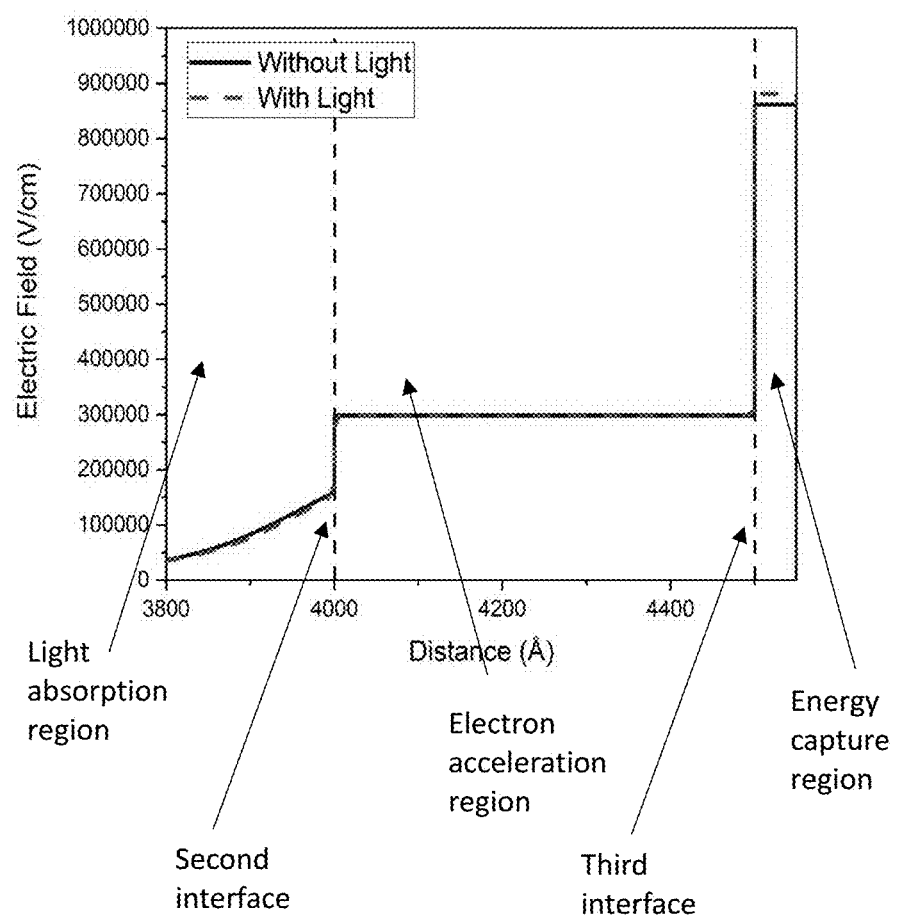
FIG. 11D is an illustration of the electric field in the light absorption, electron acceleration, and energy capture regions, both with and without an optical bias of 100 mW/cm$^2$.

As shown in FIG. 11D, the electric field is positive throughout the entire width of the energy capture region because the junction created between the energy capture region, which has a negative interface charge at the third interface due to the total polarization vector $P_4$ of the energy capture region being greater than the total polarization vector $P_3$ of the electron acceleration region, and the liquid will create this field, and will move accelerated carriers entering the energy capture region towards the liquid. The junction without doping the energy capture region gives rise to the preferred electric field orientation; therefore, the amount of p-type doping required is none, as the interface charge from polarization sets the electric field in the preferred orientation.

Figure 6:
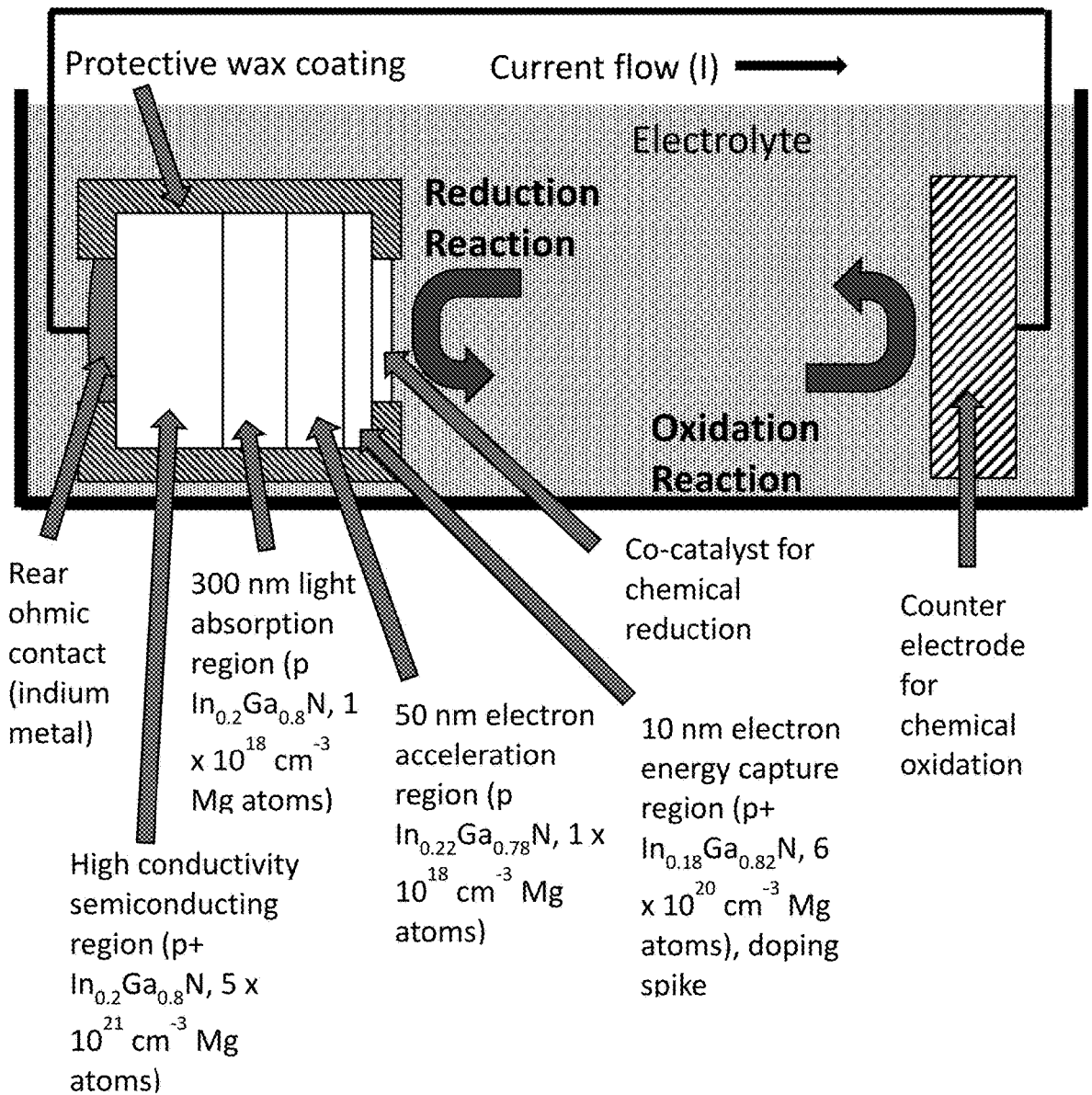
FIG. 6 is a schematic of one embodiment of a system, utilizing a structure in the III-polar (that is, [0001] oriented) direction towards the electrolyte.
Figure 7A:
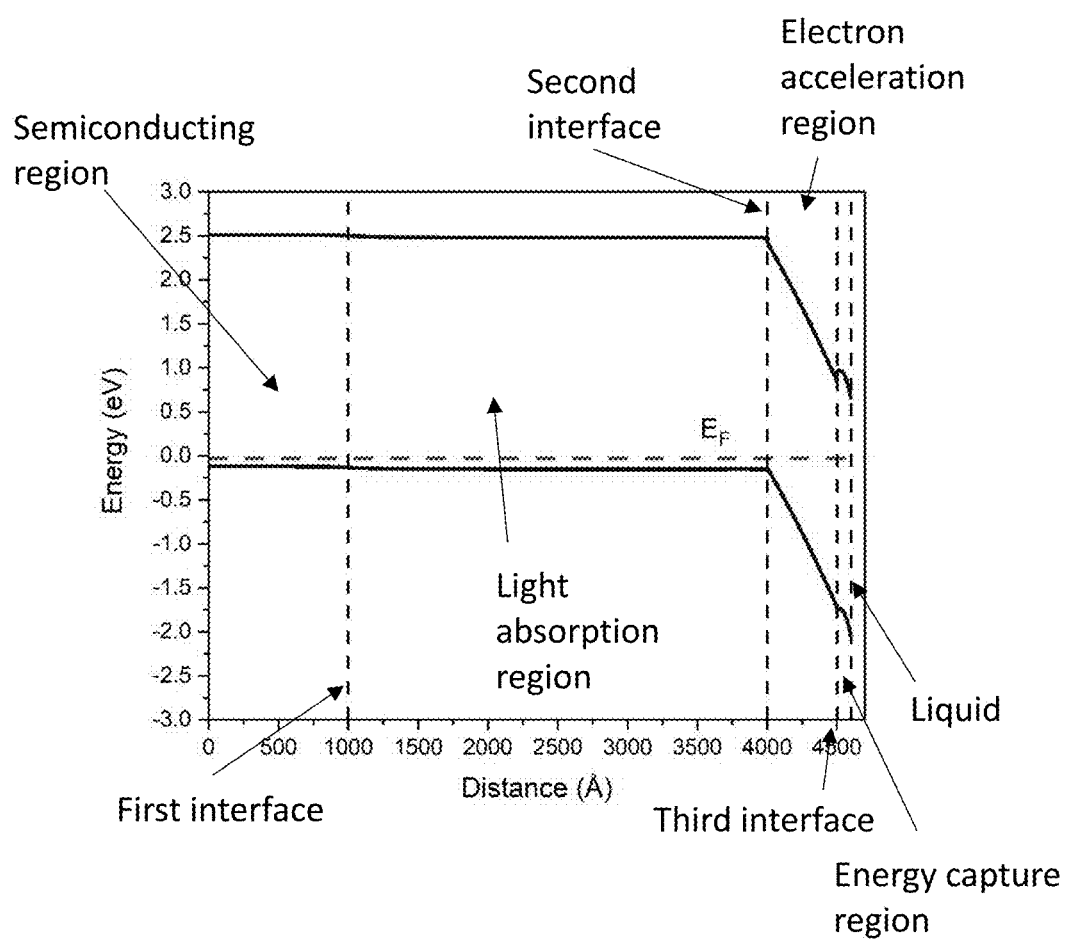
FIGS. 7A and 7B are illustrations of an energy band diagram for the embodiment in FIG. 6 of a photocathode in contact with the reduction potential of hydrogen in aqueous electrolyte.
Figure 7B:
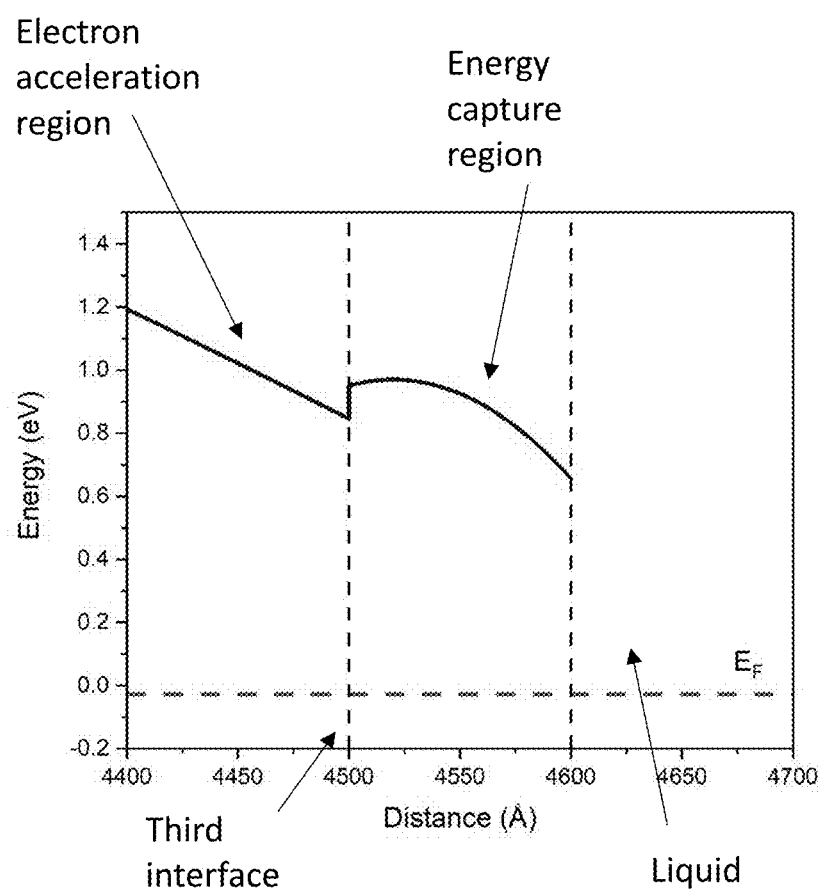
Figure 7C:
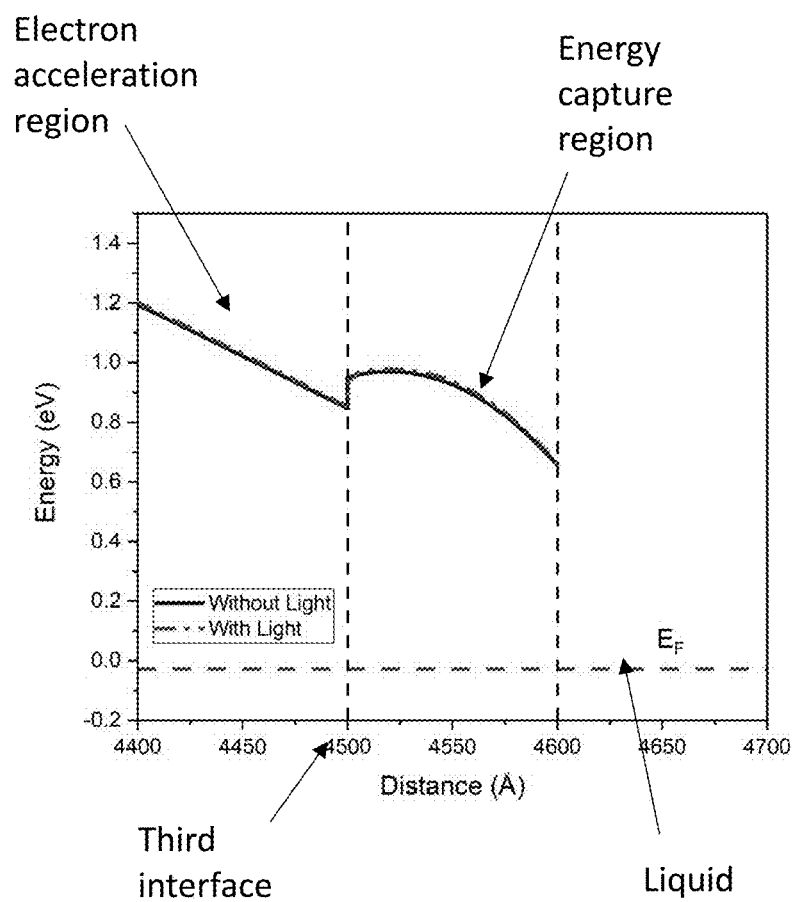
FIG. 7C is an illustration of an energy band diagram both with and without an optical bias of 100 mW/cm$^2$ for the embodiment in FIG. 6 of a photocathode in contact with the reduction potential of hydrogen in aqueous electrolyte.
Figure 7D:
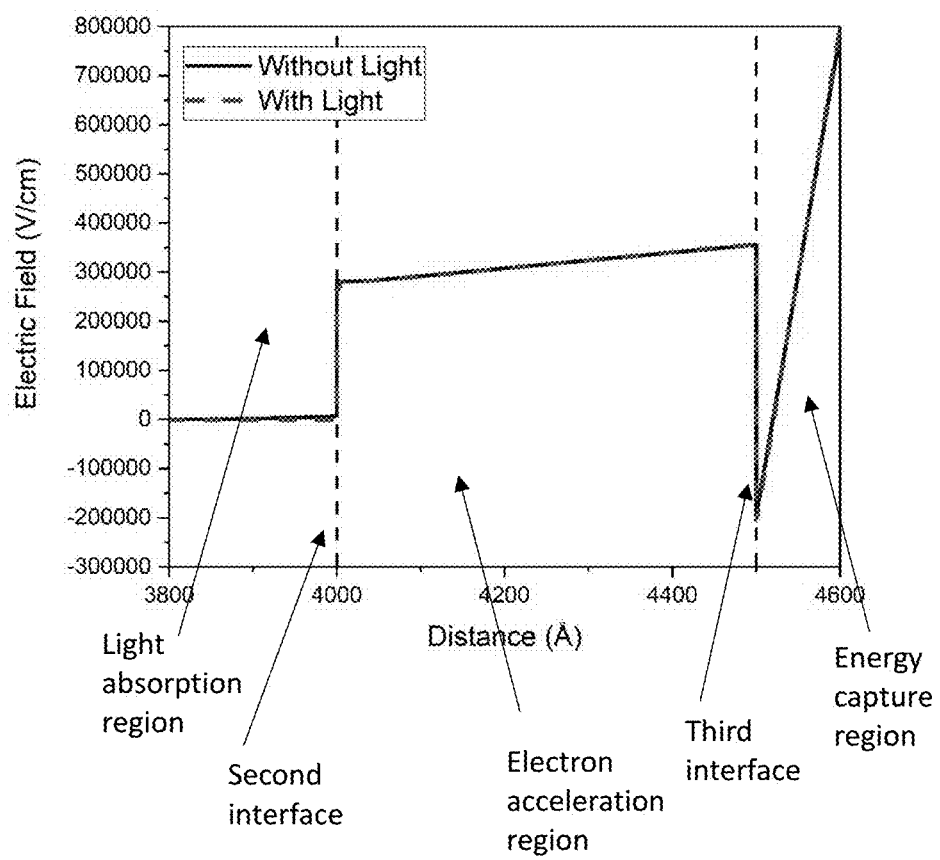
FIG. 7D is an illustration of the electric field in the light absorption, electron acceleration, and energy capture regions, both with and without an optical bias of 100 mW/cm$^2$.

As shown in FIG. 7D, the electric field in the energy capture region increases from negative to positive values across the thickness of the energy capture region. The electric field is initially negative at the third interface because of the positive interface charge created at that interface due to the total polarization vector $P_4$ of the energy capture region being less than the total polarization vector $P_3$ of the electron acceleration region for the desirable case that $E_{g,capture} > E_{g,absorption}$. If the electron sees a negative electric field, it would move towards the third interface and not towards the liquid, and if the energy capture region were not doped p-type so as to create ionized acceptors with negative space charge distributed throughout the energy capture region, this negative electric field would exist throughout the energy capture region. However, from the junction created between the energy capture region and the liquid, by additionally doping the energy capture region p-type such that ionized acceptors create a negative space charge throughout the energy capture region, the electric field increases towards positive values, and therefore accelerated electrons entering the energy capture region will move towards the liquid. Therefore, it is necessary to dope the energy capture region p-type for the embodiment described in FIG. 6 to form this desirable junction.

In some embodiments, $P_4$ is greater than $P_3$, forming a negative polarization charge at the third interface (37). This creates an electric field that accelerates the electrons toward a liquid that is in contact with the outer surface of the photocathode, either the energy capture region or the co-catalyst.

The term "liquid" as used herein preferably includes a combination of three groups of materials—a solvent, reactants, and supporting electrolyte salt. The solvent is preferably water or a non-aqueous compound such as methanol or acetonitrile, but is not limited to these compounds. Reactants are for the chemical reaction of interest at the surface of the photocathode: water, hydrogen ions, hydroxide ions, dissolved nitrogen gas, and dissolved carbon dioxide gas. Supporting electrolyte salts are any ionic compound that has a high degree of solubility within the solvent and therefore increases its conductivity.

In III-Nitride semiconductors, the ionization energy of Mg as a p-type dopant is large such that full ionization is not achieved. Typically, between 1% and 10% of Mg dopant atoms ionize, resulting in a free carrier hole concentration between 1 and 2 orders of magnitude lower than the Mg dopant concentration.

The photocathode may also optionally include a co-catalyst (40), which can be any appropriate co-catalyst for the desired reduction reaction, as understood by one of skill in the art, including but not limited to platinum, transition metal chalcogenides, or Layered double hydroxides (LDHs).

The photocathode may also optionally include a substrate (31), which could be doped p-type or n-type. In some embodiments, the contact to the semiconducting region is formed through the substrate.

In some embodiments, the substrate is a polar substrate with the direction of epitaxial growth forming an acute angle greater than or equal to zero with the [000$\bar{1}$] direction. In some of the embodiments, the light absorption region is comprised of a II-VI alloy or III-Nitride alloy having an equal or larger bandgap than a bandgap of the semiconducting region, where the alloy is able to absorb at least a portion of the solar spectrum, the electron acceleration region is comprised of a II-VI or III-Nitride alloy of larger bandgap than the light absorption region, and the energy capture region is comprised of a II-VI or III-Nitride alloy with larger bandgap than the electron acceleration region. In some of the embodiments, the substrate is n-type GaN and the contact to the semiconducting region is formed through the substrate using a tunnel junction comprised of a GaN region adjacent to the n-type GaN substrate doped n-type with a density of Si atoms between $1\times10^{19}$ cm$^{-3}$ and $1\times10^{22}$ cm$^{-3}$, an InN region with thickness in the range of 1 to 3 nm, and the first semiconducting region doped p-type with a density of Mg atoms between $1\times10^{20}$ cm$^{-3}$ and $1\times10^{22}$ cm$^{-3}$. In some of the embodiments, the substrate is an insulating material such as sapphire ($Al_2O_3$) with a layer of GaN, and the contact is formed on the top side by etching a mesa and placing a metal as shown in FIG. 2A. In some of the embodiments, the semiconducting region is doped p-type with a Mg atom density between $1\times10^{19}$ cm$^{-3}$ and $1\times10^{22}$ cm$^{-3}$, and the light absorption region, electron acceleration region, and energy capture region are doped p-type with a Mg atom density between $1\times10^{15}$ cm$^{-3}$ and $1\times10^{19}$ cm$^{-3}$. The dopants that can be utilized include, but are not limited to, Si and Mg. In some of these embodiments, the semiconducting region is comprised of $In_xGa_{1-x}N$ with a thickness in the range of 100 nm to 1000 nm and with x in the range of 0.2 to 0.22, the light absorption region is comprised of $In_{0.2}Ga_{0.8}N$ with a thickness in the range of 100 nm to 300 nm, the electron acceleration region is comprised of $In_{0.18}Ga_{0.82}N$ with a thickness in the range of 50 nm to 100 nm, and the energy capture region is comprised of $In_xGa_{1-x}N$ with x in the range of 0 to 0.16 and thickness in the range 5 nm to 100 nm. In some of the embodiments, the substrate is n-type GaN and the contact to the semiconducting region is formed through the substrate using a tunnel junction comprised of a GaN region adjacent to the n-type GaN substrate doped n-type with a density of Si atoms between $1\times10^{19}$ cm$^{-3}$ and $1\times10^{22}$ cm$^{-3}$, an InN region with thickness in the range of 1 to 3 nm, and the semiconducting region doped p-type with a density of Mg atoms between $1\times10^{20}$ cm$^{-3}$ and $1\times10^{22}$ cm$^{-3}$.

In some embodiments, the substrate is a polar substrate with the direction of epitaxial growth forming an acute angle greater than or equal to zero with the [0001] direction. In some of these embodiments, the light absorption region is comprised of a II-VI or III-Nitride alloy having an equal or smaller bandgap than a bandgap of the semiconducting region, the alloy being suitable for absorption of a portion of the solar spectrum, the electron acceleration region is comprised of a II-VI or III-Nitride alloy of smaller bandgap than the light absorption region, and the energy capture region is comprised of a II-VI or III-Nitride alloy with larger bandgap than the electron acceleration region. In some of the embodiments, the semiconducting region is doped p-type with a density of Mg atoms greater than or equal to $1\times10^{19}$ cm$^{-3}$, and more preferably between $1\times10^{19}$ cm$^{-3}$ and $1\times10^{22}$ cm$^{-3}$, the light absorption region and electron acceleration regions are doped p-type with a density of Mg atoms less than or equal to $1\times10^{19}$ cm$^{-3}$, and more preferably between $1\times10^{15}$ cm$^{-3}$ and $1\times10^{19}$ cm$^{-3}$, and the energy capture region is doped p-type with a density of Mg atoms greater than or equal to $1\times10^{19}$ cm$^{-3}$, and more preferably between $1\times10^{19}$ cm$^{-3}$ and $1\times10^{22}$ cm$^{-3}$. Further, the energy capture region has a thickness such that the negative charge distribution from the ionized acceptor dopant atoms compensates the positive interface charge at the third interface resulting from $P_4$ being less than $P_3$, forming a potential variation that allows carriers to move from the energy capture region to a liquid. In some of the embodiments, the semiconducting region is comprised of $In_xGa_{1-x}N$ with x in the range of 0 to 0.2 and a thickness in the range of 100 nm to 1000 nm, the light absorption region is comprised of $In_{0.2}Ga_{0.8}N$ with a thickness in the range of 100 nm to 300 nm, the electron acceleration region is comprised of $In_{0.22}Ga_{0.78}N$ with a thickness in the range of 50 nm to 100 nm, and the energy capture region is comprised of $In_xGa_{1-x}N$ with x in the range of 0 to 0.18 and thickness in the range 10 nm to 100 nm. In some of the embodiments, the substrate is n-type GaN and the contact to the semiconducting region is formed through the substrate using a tunnel junction comprised of a GaN region adjacent to the n-type GaN substrate doped n-type with a density of Si atoms between $1\times10^{19}$ cm$^{-3}$ and $1\times10^{22}$ cm$^{-3}$, an AlN region with thickness in the range of 1 to 3 nm, and the semiconducting region doped p-type with a density of Mg atoms between $1\times10^{20}$ cm$^{-3}$ and $1\times10^{22}$ cm$^{-3}$. In some of the embodiments, the substrate is an insulating material such as sapphire ($Al_2O_3$) with a layer of GaN having a thickness of between 1 μm and 10 μm, preferably between 2 μm and 8 μm, and more preferably between 3 μm and 7 μm, and most preferably about 5 μm, and the contact is formed on the top side by etching a mesa and placing a metal as shown in FIG. 2A.

Figure 5:
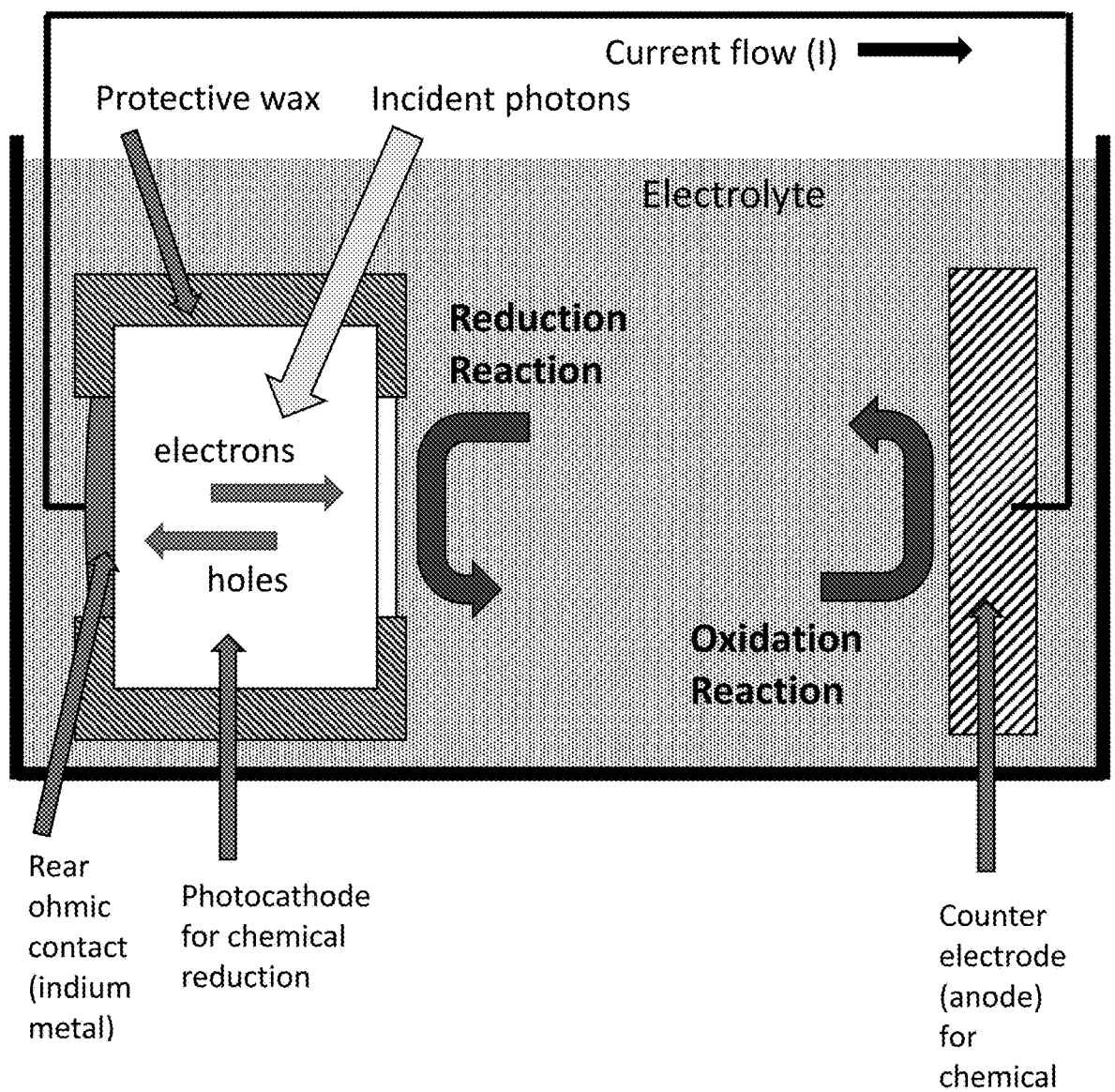
FIG. 5 is a schematic of one embodiment of a system utilizing a photocathode.

With reference to FIG. 5, a schematic of a simple embodiment of systems utilizing a photocathode is disclosed. FIG. 5 depicts a system for electrochemically driving a redox reaction in a liquid (electrolyte). The system includes a photocathode connected to a rear ohmic contact (typically indium), the photocathode being protected from the liquid by a wax coating except for an area for the contact and an area that forms a photocathode-liquid junction. The contact is electrically connected to a counter electrode (e.g., anode), with current flowing from the photocathode to the anode. In this example, incident photons are absorbed by the light absorption region of the photocathode, generating electrons which move towards the photocathode-liquid junction, and holes which move towards the contact. The photocathode drives the reduction reaction, while the anode drives the oxidation reaction.

FIG. 6 is a schematic of one embodiment of a system, utilizing a photocathode in the III-polar (that is, [0001] oriented) direction towards the electrolyte.

The modeled band diagrams in contact with the standard hydrogen reduction potential are shown in FIGS. 7A-7D.

FIG. 7A shows the energy band diagram of the embodiment in FIG. 6 in contact with the reduction potential of hydrogen in aqueous electrolyte. The light absorption region provides a region for photogenerated electrons to diffuse and/or drift towards the second interface, and photogenerated holes to diffuse and/or drift to the semiconducting region. The electron acceleration region supports a large electric field to accelerate electrons and allow them to gain kinetic energy through a velocity overshoot process described in FIGS. 15A and 15B. The energy capture region provides a conduction band offset such that when energetic electrons relax to the conduction band edge, the kinetic energy gained in the electron acceleration region is preserved at the higher potential energy in the energy capture region. FIG. 7B shows a zoomed-in version of the band diagram in FIG. 7A, focused on the conduction band offset at the electron acceleration/energy capture interface. FIG. 7C shows FIG. 7B, but additionally with optical bias of 100 mW/cm$^2$, showing that under solar illumination, the conduction band offset in the energy capture region is preserved. FIG. 7D shows the electric field at the light absorption/electron acceleration/energy capture regions and associated interfaces of the preferred embodiment in FIG. 6 for hydrogen evolution both in equilibrium and under optical bias.

Figure 8A:
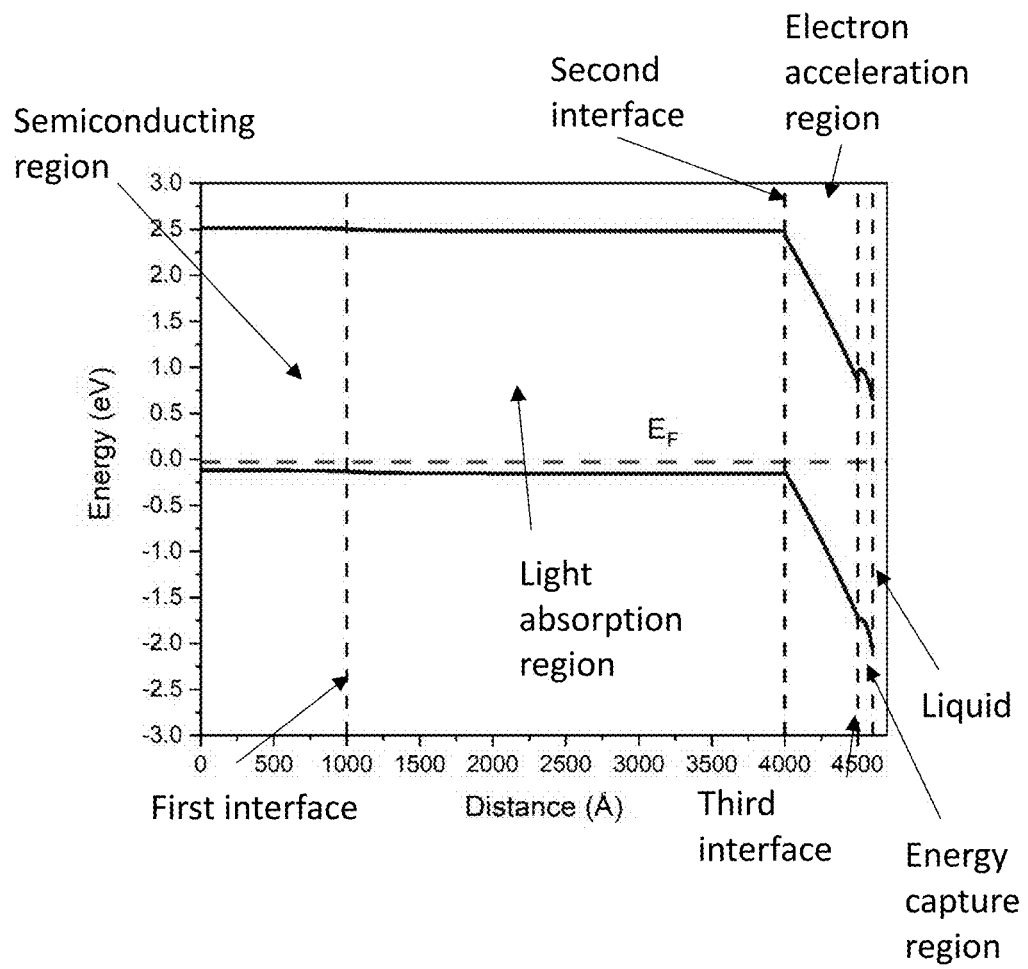
FIGS. 8A and 8B are illustrations of an energy band diagram for the embodiment in FIG. 6 of a photocathode in contact with the reduction reaction of $CO_2$ to methanol ($CH_3OH$).
Figure 8B:
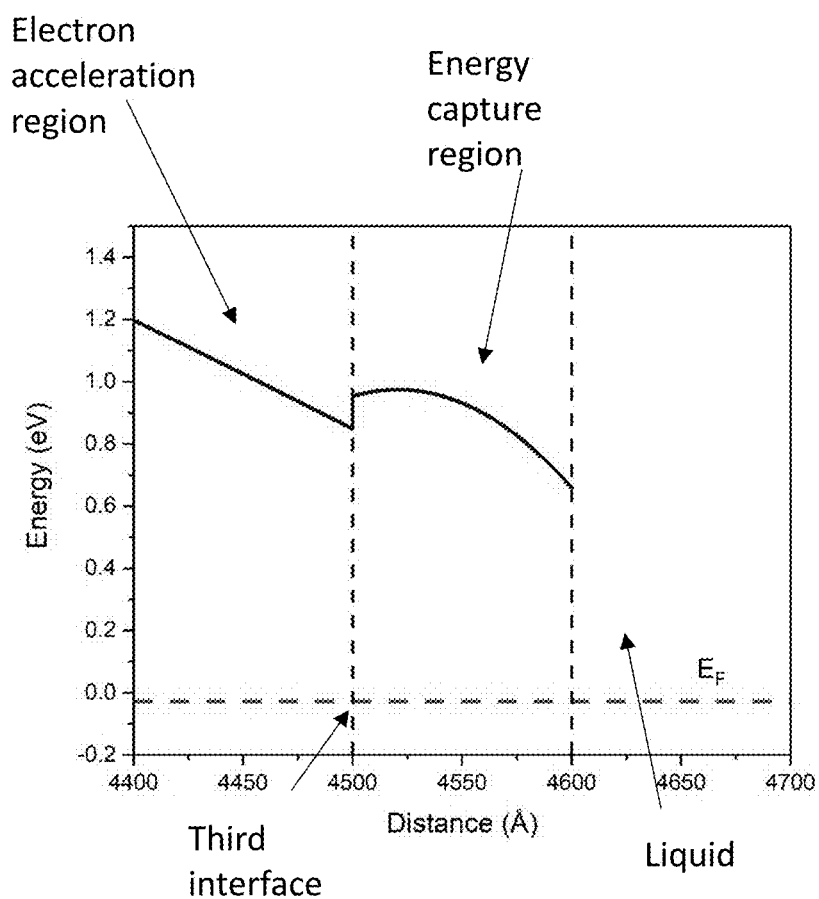

The modeled band diagrams in contact with the $CO_2$ reduction potential to methanol ($CH_3OH$) are shown in FIGS. 8A and 8B. FIG. 8A shows the energy band diagram of the preferred embodiment in FIG. 6 in contact with the reduction reaction of $CO_2$ to methanol ($CH_3OH$) having a potential of 0.023 V vs. NHE. The light absorption region provides a region for photogenerated electrons to diffuse and/or drift towards the second interface, and photogenerated holes to diffuse and/or drift to the semiconducting region. The electron acceleration region supports a large electric field to accelerate electrons and allow them to gain kinetic energy. The energy capture region provides a conduction band offset such that when energetic electrons relax to the conduction band edge, the kinetic energy gained in the electron acceleration region is preserved at the higher potential energy in the energy capture region. FIG. 8B shows a zoomed-in version of the band diagram in FIG. 8A, focused on the conduction band offset at the electron acceleration/energy capture interface.

Figure 9A:
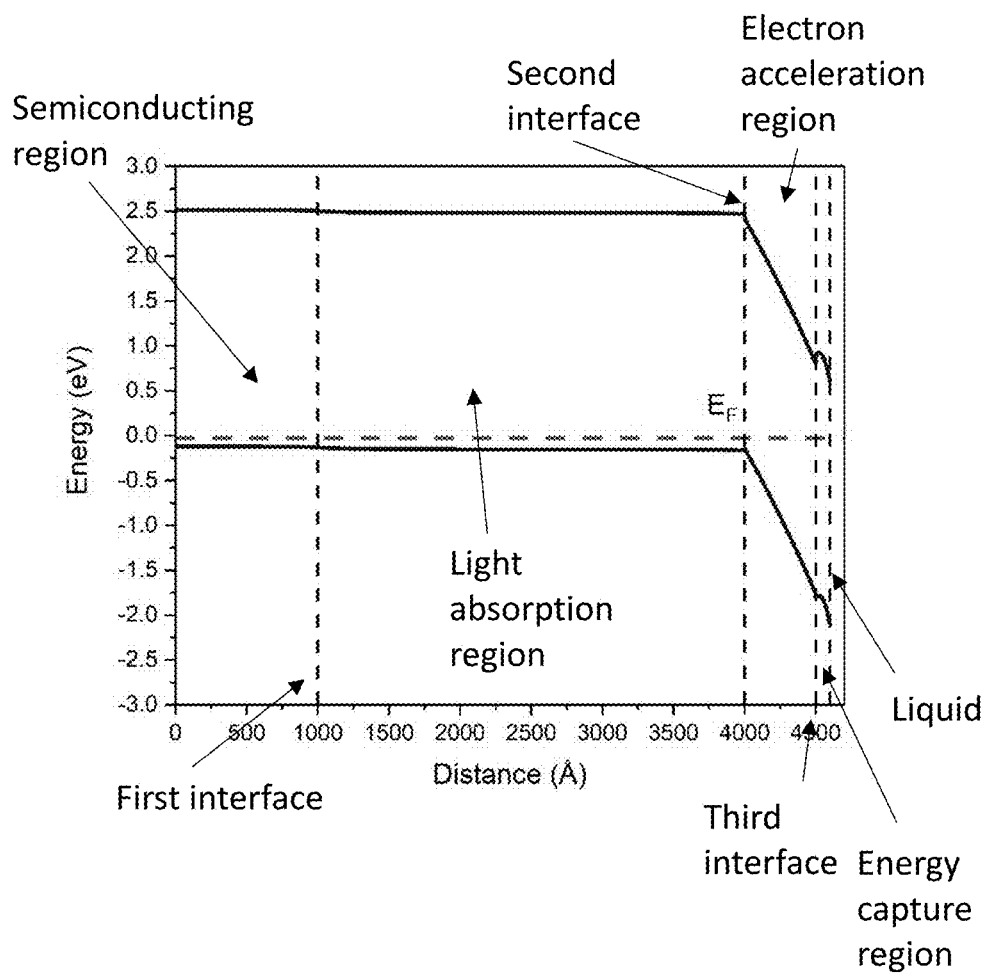
FIGS. 9A and 9B are illustrations of an energy band diagram for the embodiment in FIG. 6 of a photocathode in contact with the reduction reaction of $N_2$ to ammonia gas ($NH_3$).
Figure 9B:
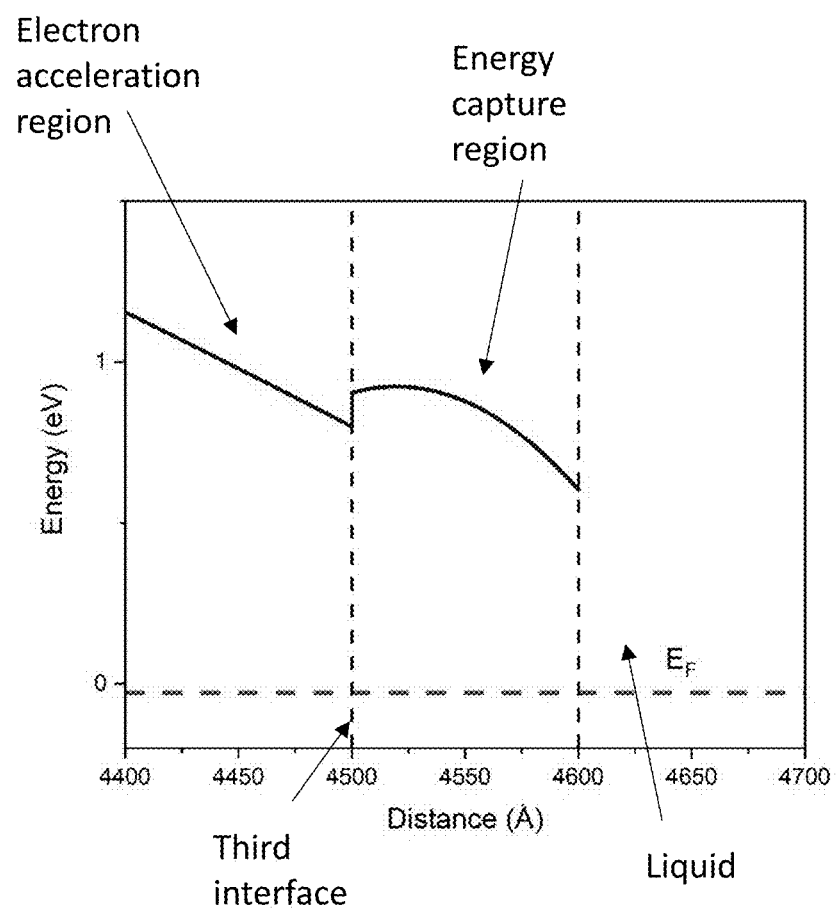

The modeled band diagrams in contact with the $N_2$ reduction potential to ammonia gas (NH3) are shown in FIGS. 9A and 9B. FIG. 9A shows the energy band diagram of the preferred embodiment in FIG. 6 in contact with the reduction reaction of $N_2$ to ammonia gas ($NH_3$) having a potential of −0.057 V vs. NHE. The light absorption region provides a region for photogenerated electrons to diffuse and/or drift towards the second interface, and photogenerated holes to diffuse and/or drift to the semiconducting region. The electron acceleration region supports a large electric field to accelerate electrons and allow them to gain kinetic energy. The energy capture region provides a conduction band offset such that when energetic electrons relax to the conduction band edge, the kinetic energy gained in the electron acceleration region is preserved at the higher potential energy in the energy capture region. FIG. 9B shows a zoomed-in version of the band diagram in FIG. 9A, focused on the conduction band offset at the electron acceleration/energy capture interface.

Figure 10:
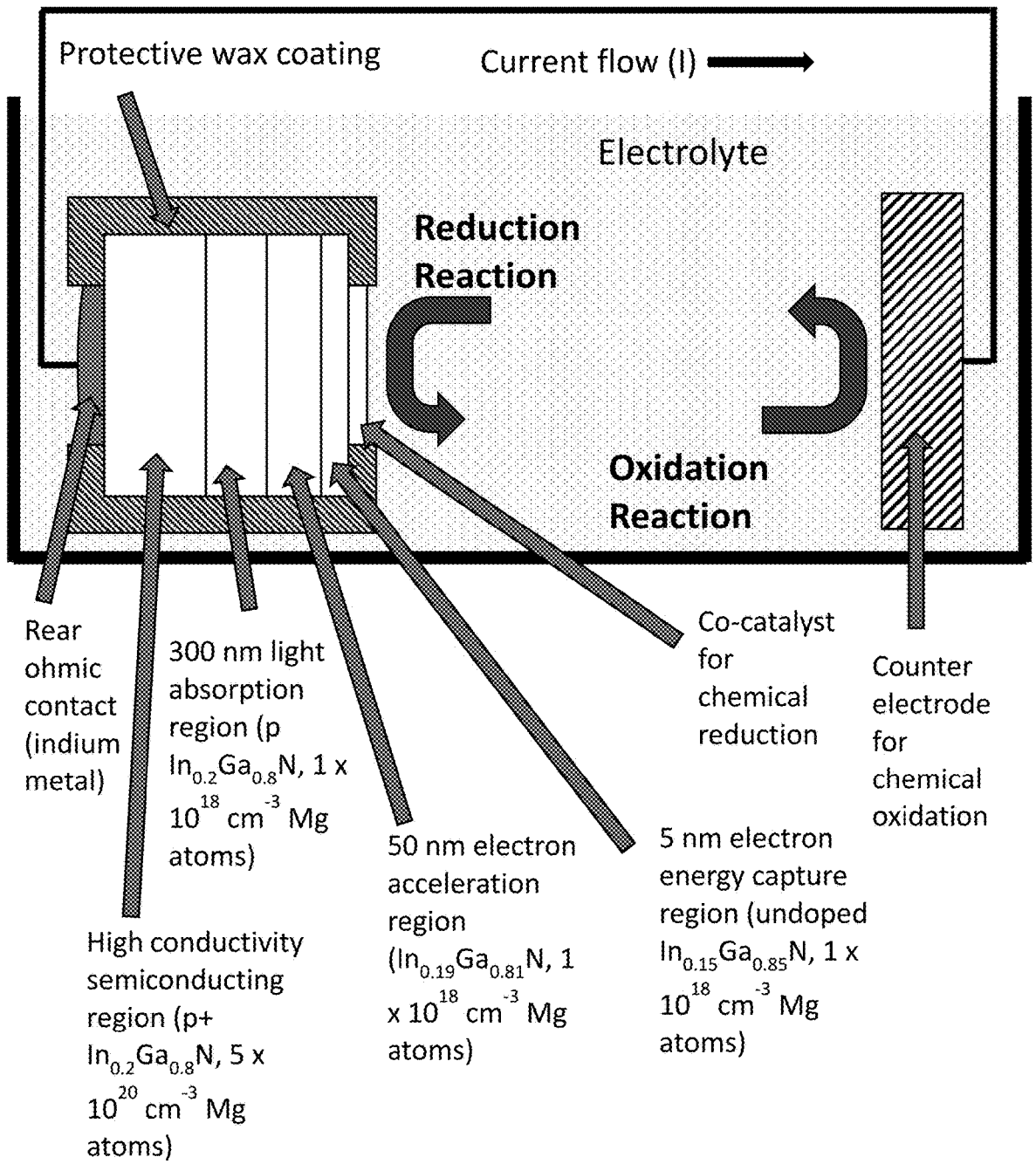
FIG. 10 is a schematic of one embodiment of a system, utilizing a structure in the V-polar (that is, [000$\bar{1}$] oriented) direction towards the electrolyte.

FIG. 10 is a schematic of another embodiment of a system, utilizing a structure in the V-polar (that is, [000$\bar{1}$] oriented) direction towards the electrolyte.

The modeled band diagrams in contact with the standard hydrogen reduction potential are shown in FIGS. 11A-11D.

FIG. 11A shows the energy band diagram of the preferred embodiment in FIG. 10 in contact with the reduction potential of hydrogen in aqueous electrolyte. The light absorption region provides a region for photogenerated electrons to diffuse and/or drift towards the second interface, and photogenerated holes to diffuse and/or drift to the semiconducting region. The electron acceleration region supports a large electric field to accelerate electrons and allow them to gain kinetic energy. The energy capture region provides a conduction band offset such that when energetic electrons relax to the conduction band edge, the kinetic energy gained in the electron acceleration region is preserved at the higher potential energy in the energy capture region. FIG. 11B shows a zoomed-in version of the band diagram in FIG. 11A, focused on the conduction band offset at the electron acceleration/energy capture interface. FIG. 11C shows FIG. 11B, but additionally with optical bias of 100 mW/cm$^2$, showing that under solar illumination, the conduction band offset in the energy capture region is preserved. FIG. 11D shows the electric field at the light absorption/electron acceleration/energy capture regions and associated interfaces of the preferred embodiment in FIG. 10 for hydrogen evolution both in equilibrium and under optical bias.

Figure 12A:
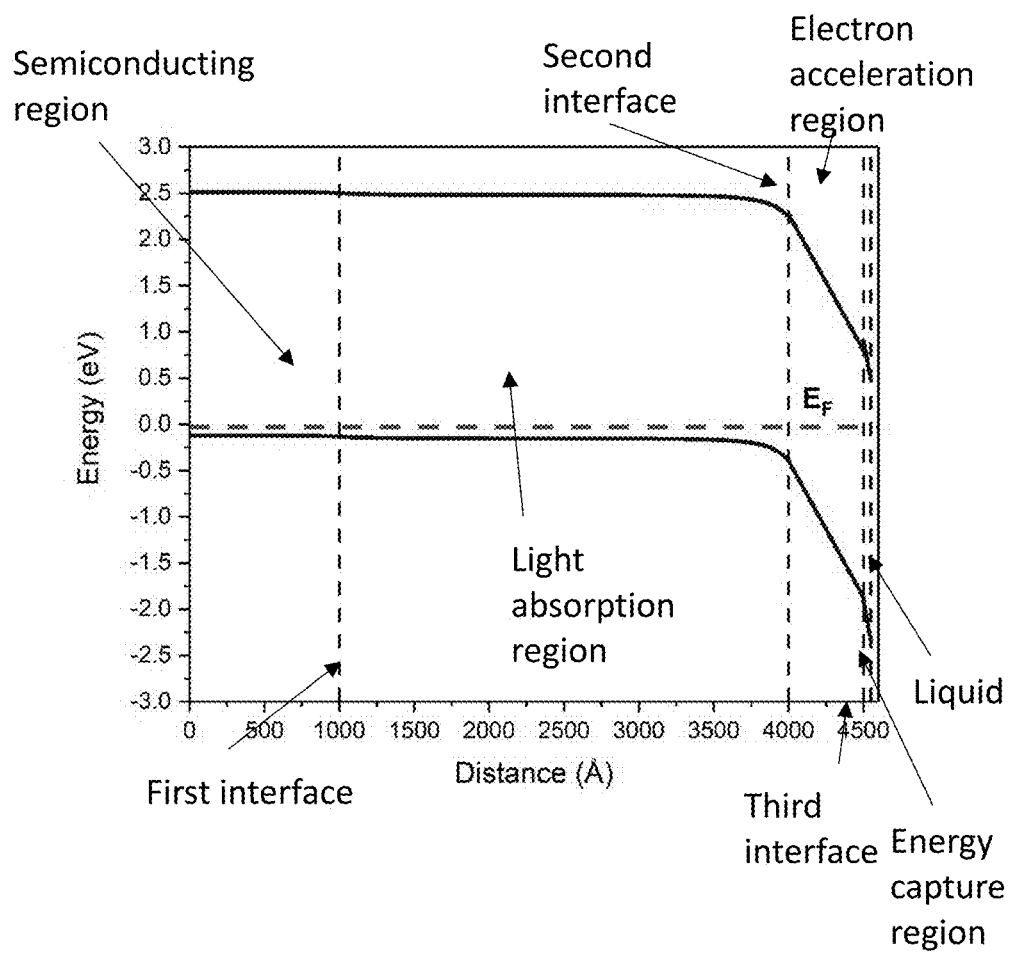
FIGS. 12A and 12B are illustrations of an energy band diagram for the embodiment in FIG. 10 of a photocathode in contact with the reduction reaction of $CO_2$ to methanol ($CH_3OH$).
Figure 12B:
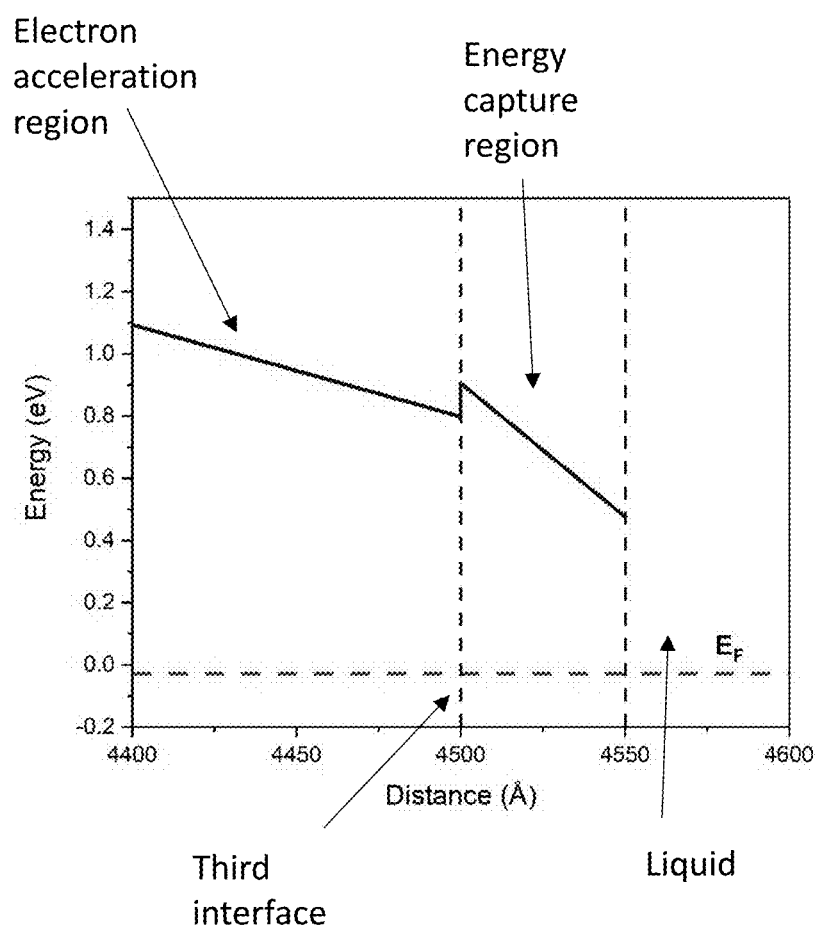

The modeled band diagrams in contact with the $CO_2$ reduction potential to methanol ($CH_3OH$) are shown in FIGS. 12A and 12B. FIG. 12A shows the energy band diagram of the preferred embodiment in FIG. 10 in contact with the reduction reaction of $CO_2$ to methanol ($CH_3OH$) having a potential of 0.023 V vs. NHE. The light absorption region provides a region for photogenerated electrons to diffuse and/or drift towards the second interface, and photogenerated holes to diffuse and/or drift to the semiconducting region. The electron acceleration region supports a large electric field to accelerate electrons and allow them to gain kinetic energy. The energy capture region provides a conduction band offset such that when energetic electrons relax to the conduction band edge, the kinetic energy gained in the electron acceleration region is preserved at the higher potential energy in the energy capture region. FIG. 12B shows a zoomed-in version of the band diagram in FIG. 12A, focused on the conduction band offset at the electron acceleration/energy capture interface.

Figure 13A:
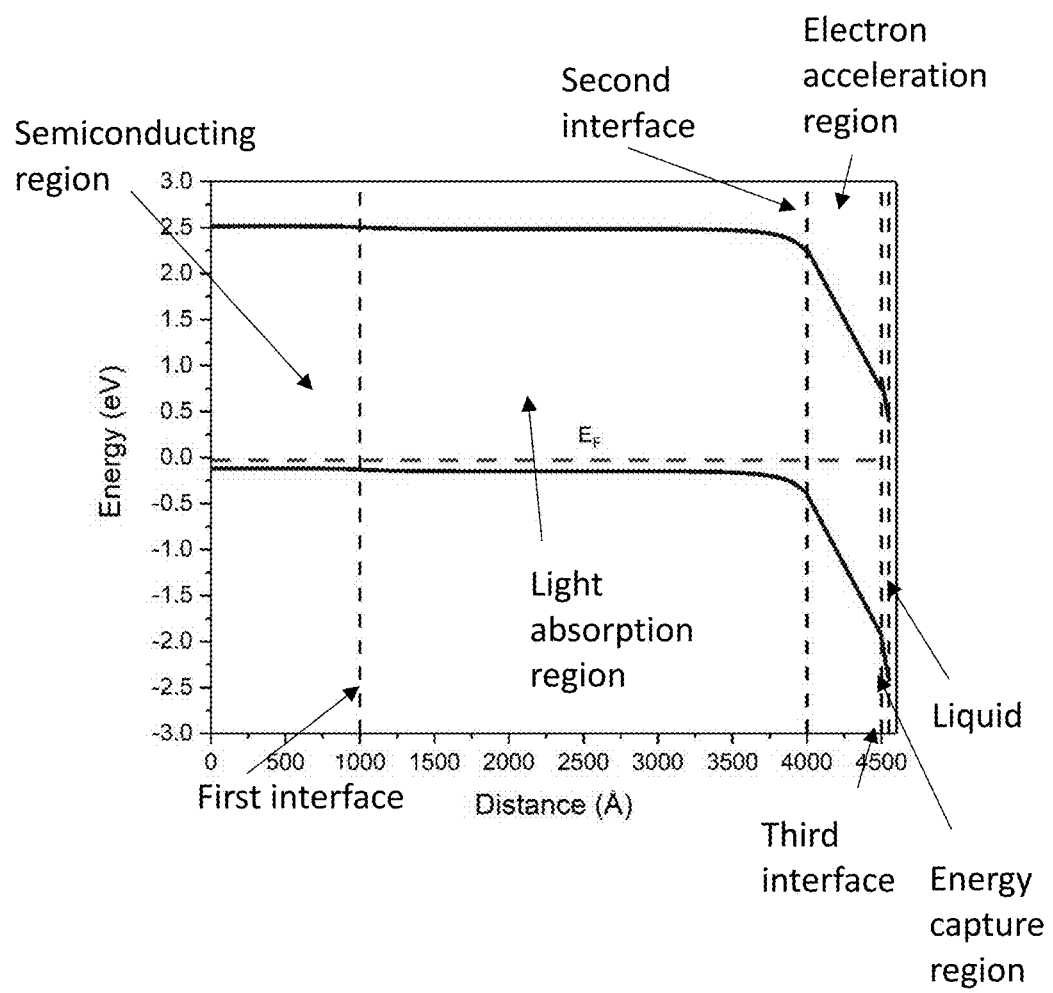
FIGS. 13A and 13B are illustrations of an energy band diagram for the embodiment in FIG. 10 of a photocathode in contact with the reduction reaction of $N_2$ to ammonia gas ($NH_3$).
Figure 13B:
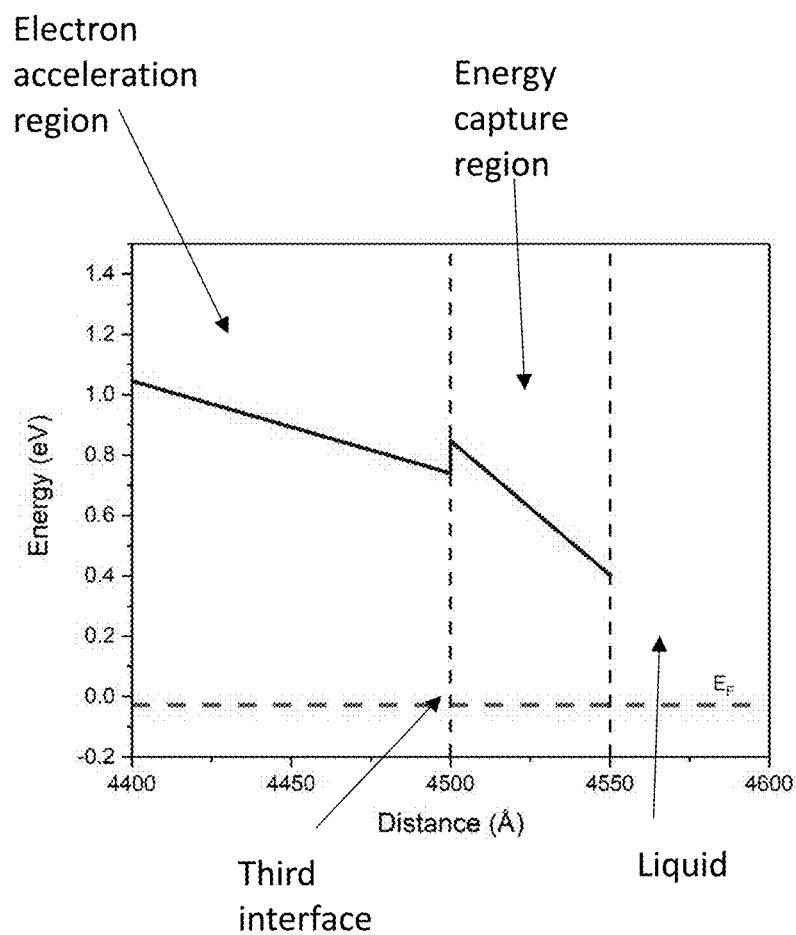

The modeled band diagrams in contact with the $N_2$ reduction potential to ammonia gas ($NH_3$) are shown in FIGS. 13A and 13B. FIG. 13A shows the energy band diagram of the preferred embodiment in FIG. 10 in contact with the reduction reaction of $N_2$ to ammonia gas ($NH_3$) having a potential of −0.057 V vs. NHE. The light absorption region provides a region for photogenerated electrons to diffuse and/or drift towards the second interface, and photogenerated holes to diffuse and/or drift to the semiconducting region. The electron acceleration region supports a large electric field to accelerate electrons and allow them to gain kinetic energy. The energy capture region provides a conduction band offset such that when energetic electrons relax to the conduction band edge, the kinetic energy gained in the electron acceleration region is preserved at the higher potential energy in the energy capture region. FIG. 13B shows a zoomed-in version of the band diagram in FIG. 13A, focused on the conduction band offset at the electron acceleration/energy capture interface.

In both of the embodiments depicted in FIGS. 6 and 10, the semiconducting region is p-typed InGaN that is thick enough to be considered relaxed; as such, it exhibits no piezoelectric polarization, just a spontaneous polarization field. The p-type doping sets the Fermi level of the electrode such that it creates a junction with the semiconductor-electrolyte interface whose photovoltaic behavior is dependent on the motion of minority electron carriers to drive a reduction reaction such as hydrogen evolution. P-type material is desirable for this application since it sets electrons as the minority carriers for driving the hydrogen evolution reaction as well as other chemical reduction processes like $CO_2$ reduction and $NH_3$ production. The p-type doping also adjusts the conduction and valence bands such that the HER potential is straddled. In preferred embodiments, the p-type doping is greater than or equal to $1 \times 10^{19}$ cm$^{-3}$ for Mg atom concentration, and more preferably between $1 \times 10^{19}$ cm$^{-3}$ and $1 \times 10^{22}$ cm$^{-3}$ for Mg atom concentration. The former provides enough of a carrier concentration to set the Fermi level in the region, and the latter is the realistic maximum concentration achievable material-wise with molecular beam epitaxy using a magnesium effusion cell.

In these embodiments, a voltage can be generated to drive unassisted water splitting with this cathode and a counter anode. The InGaN layer exhibits light absorption for its entire alloy range and the subsequent layers are in relation to it, and thus this invention is not limited to specific compositions. That said, at 59% indium, the material undergoes a surface electron inversion that could potentially impede carrier flow, and thus preferred embodiments utilize between 20% and 50% indium, more preferably between 25% and 40% indium, and most preferably 26%, 28%, 32%, 37%, or 40% indium. In other preferred embodiments, a lower amount of indium alloying is required in order to generate enough of an overpotential to overcome the catalytic losses for these chemical reduction reactions.

The kinetic energy gained by an electron undergoing velocity overshoot has a broad distribution between 0 eV and 2.5 eV as shown in FIG. 15B, meaning that the conduction band offset, between the electron acceleration and energy capture regions, can be designed for any energy between the two values, and at least some fraction of energetic electrons could be captured within this design. As shown in FIGS. 7B and 11B, the energy capture regions provide a conduction band energy offset of 0.105 eV and 0.107 eV for the FIGS. 6 and 10 embodiments, respectively, for hydrogen evolution. These heights provide an offset by which some of the kinetic energy they obtain is preserved once the carriers thermalize to the conduction band minimum. As shown in FIGS. 8B and 12B, the energy capture regions provide a conduction band energy offset of 0.105 eV and 0.108 eV for the FIGS. 6 and 10 embodiments, respectively, for methanol evolution from $CO_2$. These heights are not too large such that the electron cannot surmount the barrier, yet they provide an offset by which some of the kinetic energy they obtain is preserved once the carriers thermalize to the conduction band minimum. As shown in FIGS. 9B and 13B, the energy capture regions provide a conduction band energy offset of 0.105 eV and 0.107 eV the FIGS. 6 and 10 embodiments, respectively, for $NH_3$ production. These heights are not too large such that the electron cannot surmount the barrier, yet they provide an offset by which some of the kinetic energy they obtain is preserved once the carriers thermalize to the conduction band minimum. When the electric field of the electron acceleration region is probed as shown in FIGS. 7D and 11D, in equilibrium the fields are 356 kV/cm and 298 kV/cm for the FIGS. 6 and 10 embodiments, respectively, for hydrogen evolution. Therefore, the electron acceleration regions can support the polarization fields required to accelerate carriers to gain kinetic energy beyond the conduction band minimum, and from previous art, these electric fields are high enough to obtain a continuous distribution of electrons at kinetic energies between 0 and 2.5 eV, so at least some will be obtained by the energy capture region.

Figure 18A:
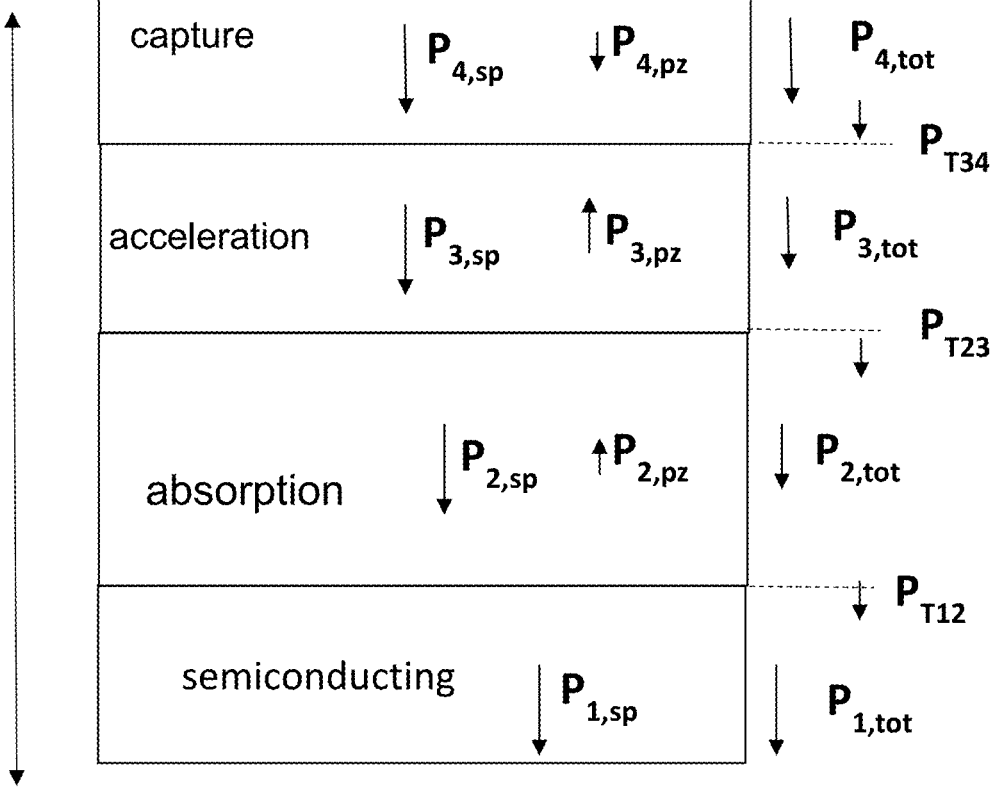
FIG. 18A is a schematic showing the polarization vectors within the regions for a coherently strained four-layer photocathode for the case of a Group II or Group III-polar device where the photocathode is grown on a Group II or Group III-polar template or free-standing substrate.
Figure 18B:
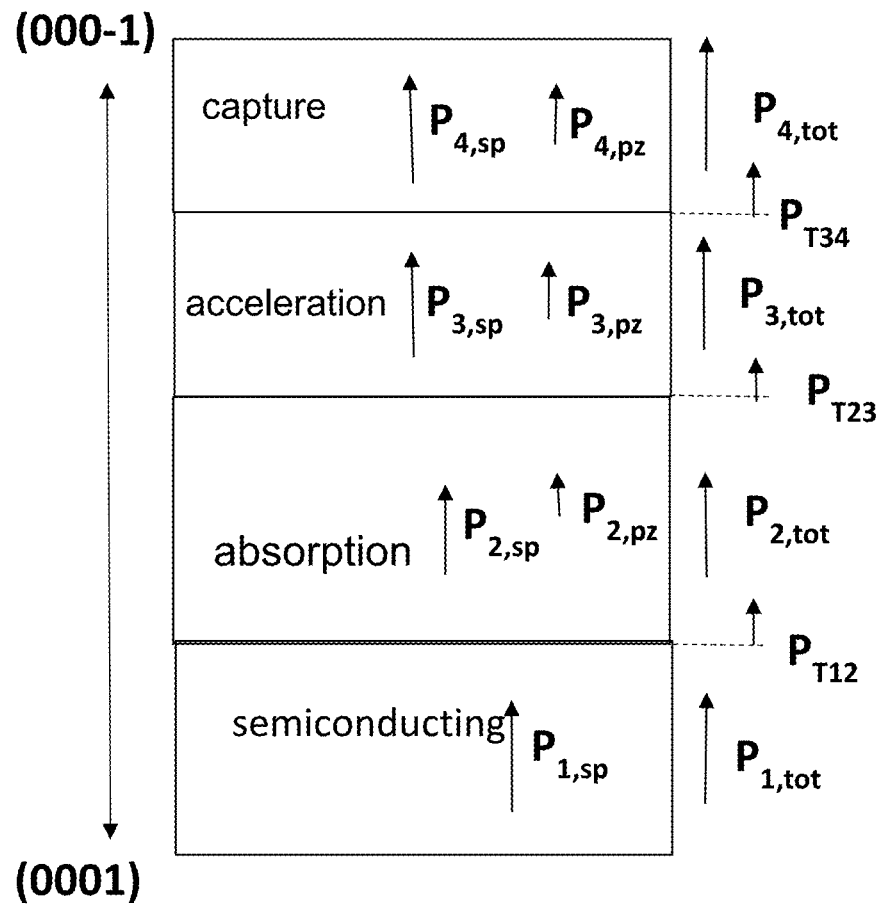
FIG. 18B is a schematic showing the polarization vectors within the regions for a coherently strained four-layer photocathode for the case of a Group V or Group VI-polar device where the photocathode is grown on a Group V or Group VI-polar template or free-standing substrate.
Figure 18C:
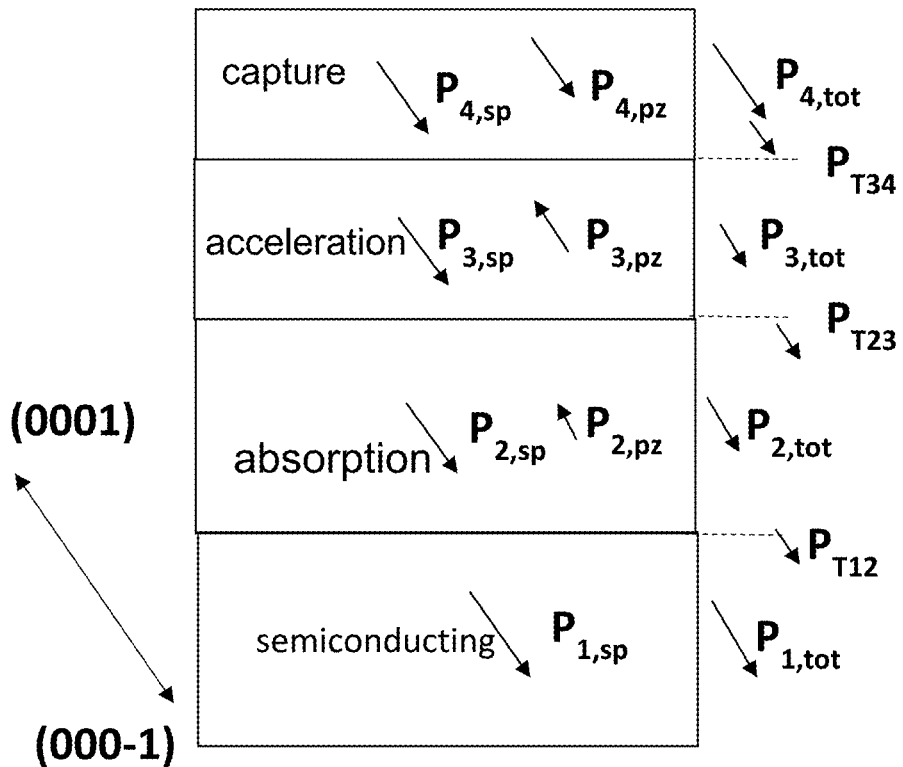
FIG. 18C is a schematic showing the polarization vectors within the regions for a coherently strained four-layer photocathode for the case where the photocathode is grown on a template or free-standing substrate, but in a semipolar direction at an acute angle to the II- or III-polar c-plane (0001) direction.
Figure 18D:
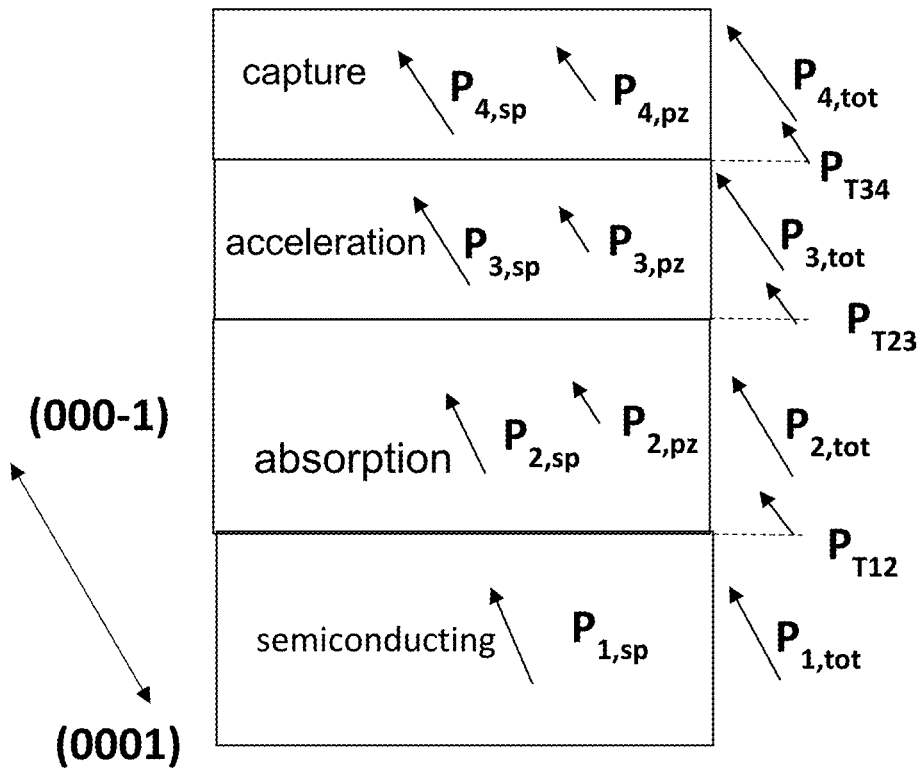
FIG. 18D is a schematic showing the polarization within the regions for a coherently strained four-layer photocathode for the case of a Group V or Group VI-polar device where the photocathode is grown on a template or free-standing substrate, but in a semipolar direction at an acute angle to the V- or VI-polar c-plane (000$\bar{1}$) direction.

The disclosed photocathode declared does not just encompass the c-plane polarization directions, but also the semipolar configurations as well (as depicted in FIGS. 18C and 18D), because although it is not as ideal in terms of obtaining the largest possible fields, semipolar configurations still support the physics required in this invention, and in some cases are ideal within a context of a photonic device design, such as a (20-21) oriented LED or a (10-10) catalytically active surface for chemistry reactions. Therefore, it is worthwhile to investigate the embodiments depicted in FIGS. 6 and 10 by varying the crystallographic direction.

Figure 14A:
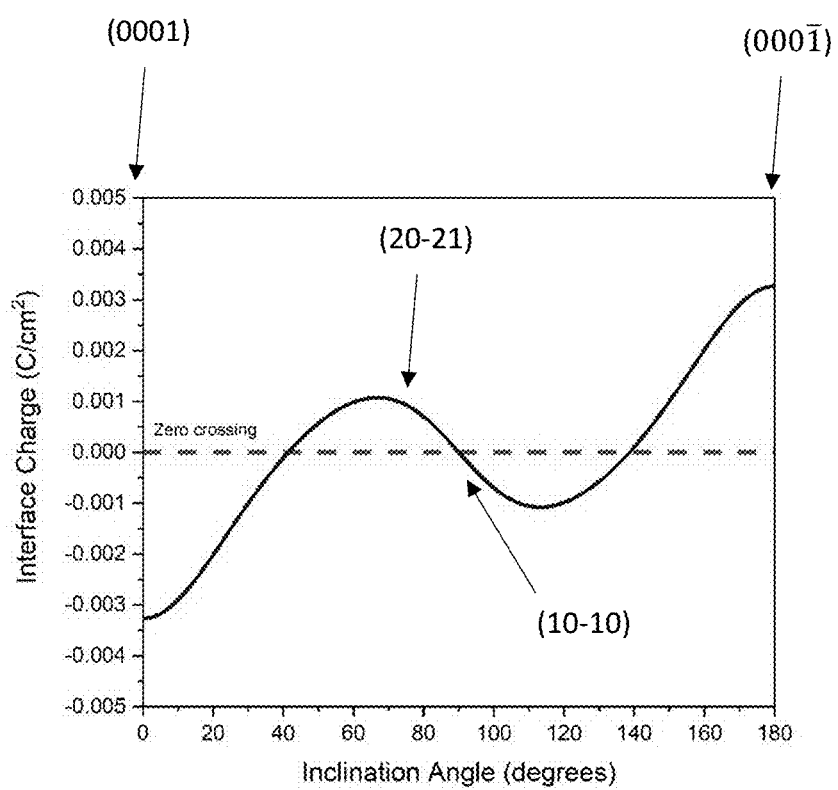
FIGS. 14A and 14B show the interface charge (second interface) between the light absorption and electron acceleration regions within the two embodiments in FIGS. 6 and 10, respectively, of a photocathode as a function of the inclination angle (i.e. the crystallographic tilt).

FIG. 14A shows the interface charge between the light absorption and electron acceleration regions within the preferred embodiment implementation of FIG. 6 as a function of the inclination angle (i.e. the crystallographic tilt). The interface charge varies with inclination angle because it is determined by the projection of the polarization vector on the growth direction.

Figure 14B:
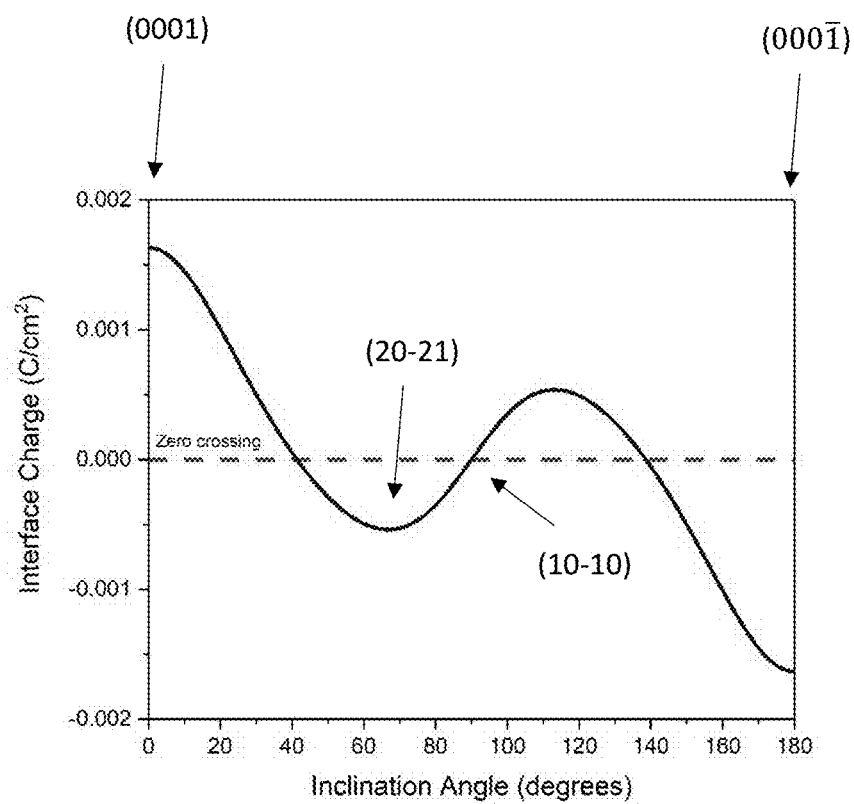

FIG. 14B shows the interface charge between the light absorption and electron acceleration regions within the preferred embodiment implementation of FIG. 10 as a function of the inclination angle (i.e. the crystallographic tilt). The interface charge varies with inclination angle because it is determined by the projection of the polarization vector on the growth direction.

FIGS. 14A and 14B show the charge density at the light absorption/electron acceleration interface, which sets up the electric field, as a function of the inclination angle, for electron acceleration region. Electron velocity overshoot is not achieved for electric fields less than 125 kV/cm. In order for an electric field to exist that can induce electron acceleration, the inclination angle should be not be larger than 27 degrees for a 2% difference in In content between the light absorption and electron acceleration regions, as depicted in the preferred embodiments of FIGS. 6 and 10. However, larger interface charge can be obtained for larger inclination angles by increasing the percentage difference between the In contents for the light absorption and electron acceleration regions.

The disclosed system utilizes hot carriers generated through polarization fields in semiconductors. Coupling polarization field electron acceleration and an energy capture region with a conduction band offset provides the extra energy required to drive a photocathode at a high efficiency using, e.g., III-Nitride materials. The disclosed invention uses, e.g., an epitaxial layer in the same III-Nitride materials system to provide the necessary conduction band offset, which minimizes interfacial defect recombination, and it takes into account polarization fields that fundamentally affect the operation of the invention.

The disclosed system assesses III-polar, V-polar, and semipolar configurations of an energy capture region design. Moreover, it uses the process within the polarization-field induced electron acceleration, providing direct coupling between light absorption, energy capture, and electron acceleration region.

Figure 16A:
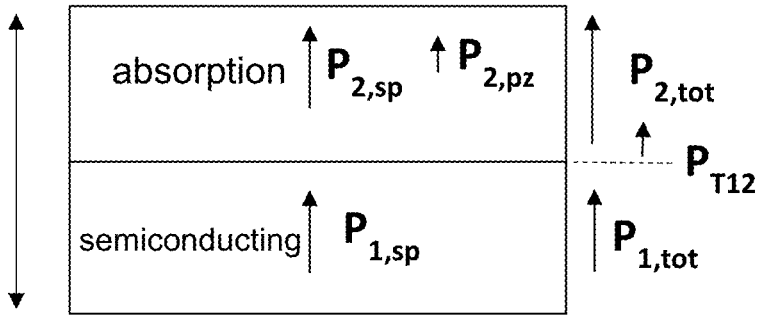
FIGS. 16A and 16B are schematics of different polarization configurations based on two design parameters: the bandgap energy variation between the semiconducting and light absorption regions, and the polarity of the growth (and therefore crystallographic) direction.
Figure 16B:
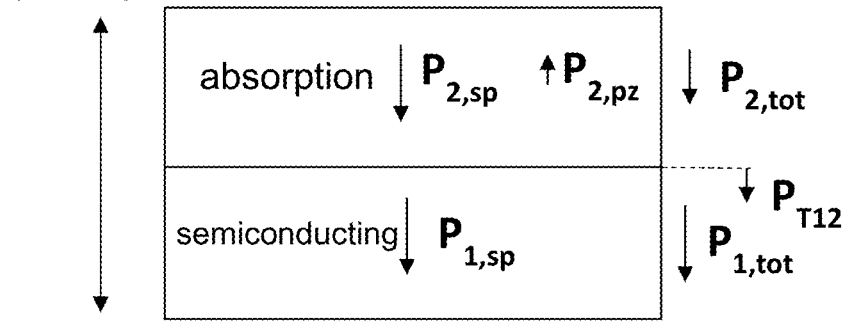

FIGS. 16A and 16B show different polarization configurations based on two design parameters: the bandgap energy variation between the semiconducting and light absorption regions, and the polarity of the growth (and therefore device) direction. It is desirable that as a photogenerated electron is created in the light absorption region, it moves away from that interface under a polarization field. Therefore, the polarization charge should be negative.

FIG. 16A illustrates the net interface polarization $P_T$ (the vector difference of the individual polarization fields $P_1$ and $P_2$, each having a spontaneous sp and piezoelectric pz component in their respective regions), where $E_{g,absorption} > E_{g,semiconducting}$ for the case of a Group VI or Group V-polar device, where a relaxed semiconducting region is grown on a Group VI or Group V-polar template or free-standing substrate, and then a coherently strained light absorption region is grown on top of the semiconducting region. Since the semiconducting region is relaxed, it only has a spontaneous polarization, while the light absorption region has an additional piezoelectric polarization that adds to the spontaneous polarization, since $E_{g,absorption} > E_{g,semiconducting}$ and the strain in the light absorption region is tensile. Moreover, the change in spontaneous polarization between the semiconducting region and the light absorption region for such a small change in In content is negligible. Therefore, $P_2$ is greater than $P_1$, and from applying a Gaussian pillbox with the divergence theorem for polarization, due to a larger polarization field exiting the interface as compared to entering, the interface charge is negative.

FIG. 16B illustrates the net interface polarization $P_T$ (the vector difference of the individual polarization fields $P_1$ and $P_2$, each having a spontaneous sp and piezoelectric pz component in their respective region), where $E_{g,absorption} < E_{g,semiconducting}$ for the case of a Group II or Group III-polar device, where the semiconducting region is grown on a Group II or Group III-polar template or free-standing substrate, and then a coherently strained light absorption region is grown on top of the semiconducting region. Since the semiconducting region is relaxed, it only has a spontaneous polarization, while the light absorption region has an additional piezoelectric polarization that subtracts from the spontaneous polarization, since $E_{g,absorption} < E_{g,semiconducting}$ and the strain in the light absorption region is compressive. Moreover, the change in spontaneous polarization between the semiconducting region and the light absorption region for such a small change in In content is negligible. Therefore, $P_2$ is greater than $P_1$ (i.e., $P_2$ is less negative than $P_1$), and from applying a Gaussian pillbox with the divergence theorem for polarization, due to a larger magnitude polarization field exiting the interface as compared to entering, the interface charge is negative.

Figure 17A:
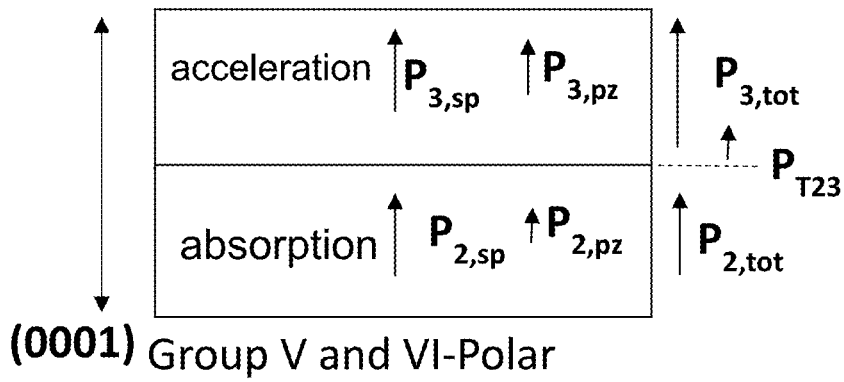
FIGS. 17A and 17B are schematics of different polarization configurations based on two design parameters: the bandgap energy variation between the light absorption and electron acceleration regions, and the polarity of the growth (and therefore crystallographic) direction.
Figure 17B:
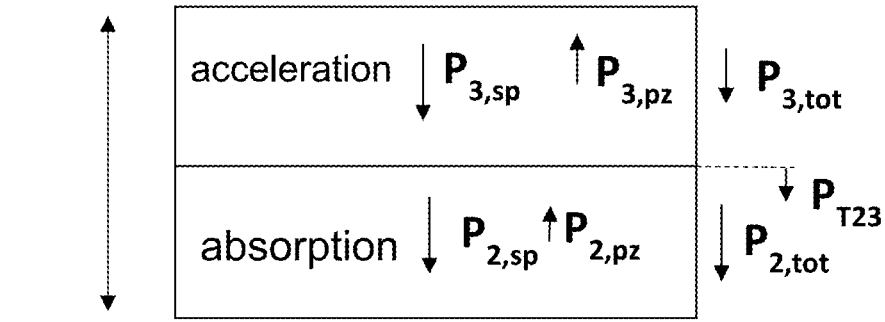

FIGS. 17A and 17B show the different polarization configurations based on two design parameters: the bandgap energy variation between the light absorption and electron acceleration regions, and the polarity of the growth (and therefore device) direction. It is desirable that as an electron enters the electron acceleration region from the light absorption region at the second interface it moves away from the second interface under a high magnitude polarization field. Therefore, the polarization charge should be negative.

FIG. 17A illustrates the net interface polarization $P_T$ (the vector difference of the individual polarization fields $P_2$ and $P_3$, each having a spontaneous sp and piezoelectric pz component in their respective region), where $E_{g,acceleration} > E_{g,absorption}$ for the case of a Group VI or Group V-polar device, where the light absorption region is grown coherently strained on a semiconducting region that is grown relaxed on a Group VI or Group V-polar template or free-standing substrate as in FIG. 16A, and then a coherently strained electron acceleration region is grown on top of the light absorption region. Since the electron acceleration region is also coherently strained to the semiconducting region but has a larger bandgap than the light absorption region, it has a larger piezoelectric polarization than the light absorption region, which adds to the spontaneous polarization because the strain is tensile. Moreover, the change in spontaneous polarization between the electron acceleration region and the light absorption region for such a small change in In content is negligible. Therefore, $P_3$ is greater than $P_2$, and from applying a Gaussian pillbox with the divergence theorem for polarization, due to a larger polarization field exiting the interface as compared to entering, the interface charge is negative.

FIG. 17B illustrates the net interface polarization $P_T$ (the vector difference of the individual polarization fields $P_2$ and $P_3$, each having a spontaneous sp and piezoelectric pz component in their respective region), where $E_{g,acceleration} < E_{g,absorption}$ for the case of a Group II or Group III-polar device, where the light absorption region is grown coherently strained on a semiconducting region that is grown relaxed on a Group II or Group III-polar template or free-standing substrate as in FIG. 16B, and then a coherently strained electron acceleration region is grown on top of the light absorption region. Since the electron acceleration region is also coherently strained to the semiconducting region but has a smaller bandgap than the light absorption region, it has a larger piezoelectric polarization than the light absorption region, which subtracts from the spontaneous polarization because the strain is compressive. Moreover, the change in spontaneous polarization between the electron acceleration region and the light absorption region for such a small change in In content is negligible. Therefore, $P_3$ is greater than $P_2$ (i.e., $P_3$ is less negative than $P_2$), and from applying a Gaussian pillbox with the divergence theorem for polarization, due to a larger polarization field exiting the interface as compared to entering, the interface charge is negative.

FIGS. 18A-18D depict different polarization configurations across the entire photocathode.

FIG. 18A, preferred embodiment for II or III-polar orientation, illustrates the polarization at the interfaces for a coherently strained four-layer structure involving the semiconducting, light absorption, electron acceleration, and energy capture regions, where $E_{g,absorption} < E_{g,semiconducting}$, $E_{g,acceleration} < E_{g,absorption}$ and $E_{g,capture} > E_{g,acceleration}$ for the case of a Group II or Group III-polar device where the light absorption region is grown on a Group II or Group III-polar template or free-standing substrate. As noted above for FIGS. 16B and 17B, since $E_{g,absorption} < E_{g,semiconducting}$, and $E_{g,acceleration} < E_{g,absorption}$, the compressive strain is larger in the acceleration region than in the light absorption region, resulting in $P_3 > P_2 > P_1$, and a negative interface charge at the first and second interfaces. This scheme therefore works for electron drift in the light absorption region and electron acceleration in the electron acceleration region. However, since $E_{g,capture} > E_{g,absorption}$, the energy capture region is under tensile strain and the piezoelectric polarization adds to the spontaneous polarization, making $P_4$ more negative than $P_3$ (i.e., $P_3 > P_4$) and therefore leading to a positive interface charge at the third interface. Nevertheless, the electron energy capture region will still work if the energy capture region is doped p-type to get a charge compensation to get the appropriate band-bending that moves electrons towards the liquid.

FIG. 18B, preferred embodiment for V-polar orientation, illustrates the polarization at the interfaces for a coherently strained four-layer structure involving the semiconducting, light absorption, electron acceleration, and energy capture regions, where $E_{g,absorption} > E_{g,semiconducting}$, $E_{g,acceleration} > E_{g,absorption}$ and $E_{g,capture} > E_{g,acceleration}$ for the case of a Group V or Group VI-polar device where the light absorption region is grown on a Group V or Group VI-polar template or free-standing substrate. As noted above for FIGS. 16A and 17A, since $E_{g,absorption}>E_{g,semiconducting}$, and $E_{g,acceleration}>E_{g,absorption}$, the tensile strain is larger in the acceleration region than in the light absorption region, resulting in $P_3>P_2>P_1$, and a negative interface charge at the first and second interfaces. Since $E_{g,capture}>E_{g,acceleration}$, the tensile strain, and therefore the piezoelectric polarization, is larger in the energy capture region than in electron acceleration region and adds to the spontaneous polarization, thus making $P_4>P_3$ and creating a negative interface charge at the third interface. This scheme therefore works for electron drift in the light absorption region, electron acceleration in the electron acceleration region, and electron energy capture in the energy capture region.

FIG. 18C illustrates the polarization at the interfaces for a coherently strained four-layer structure involving the semiconducting, light absorption, electron acceleration, and energy capture regions, where $E_{g,absorption}<E_{g,semiconducting}$, $E_{g,acceleration}<E_{g,absorption}$ and $E_{g,capture}>E_{g,acceleration}$ for the case of a Group II or Group III-polar device where the light absorption region is grown on a Group II or Group III-polar template or free-standing substrate, but in a semipolar direction at an acute angle to the III-polar c-plane (0001) direction. The function of the device is qualitatively similar to the device in FIG. 18A, but with reduced interface charges due to the projection of the polarization on to the growth direction.

FIG. 18D illustrates the polarization at the interfaces for a coherently strained four-layer structure involving the semiconducting, light absorption, electron acceleration, and energy capture regions, where $E_{g,absorption}>E_{g,semiconducting}$, $E_{g,acceleration}>E_{g,absorption}$ and $E_{g,capture}>E_{g,acceleration}$ for the case of a Group V or Group VI-polar device where the light absorption region is grown on a Group V or Group VI-polar template or free-standing substrate, but in a semipolar direction at an acute angle to the V-polar c-plane (000-1) direction. The function of the device is qualitatively similar to the device in FIG. 18B, but with reduced interface charges due to the projection of the polarization on to the growth direction.

The disclosed system and method provides unassisted, solar-powered hydrogen generation for alternative energy sources like fuel cells. Further, the system and method additionally enables the use of alternative reactions like $CO_2$ reduction into methanol for fuel cells and combustion engines, as well as $N_2$ reduction to ammonia gas as a renewable source of feedstock and fertilizer for food production processes.

Figure 19:
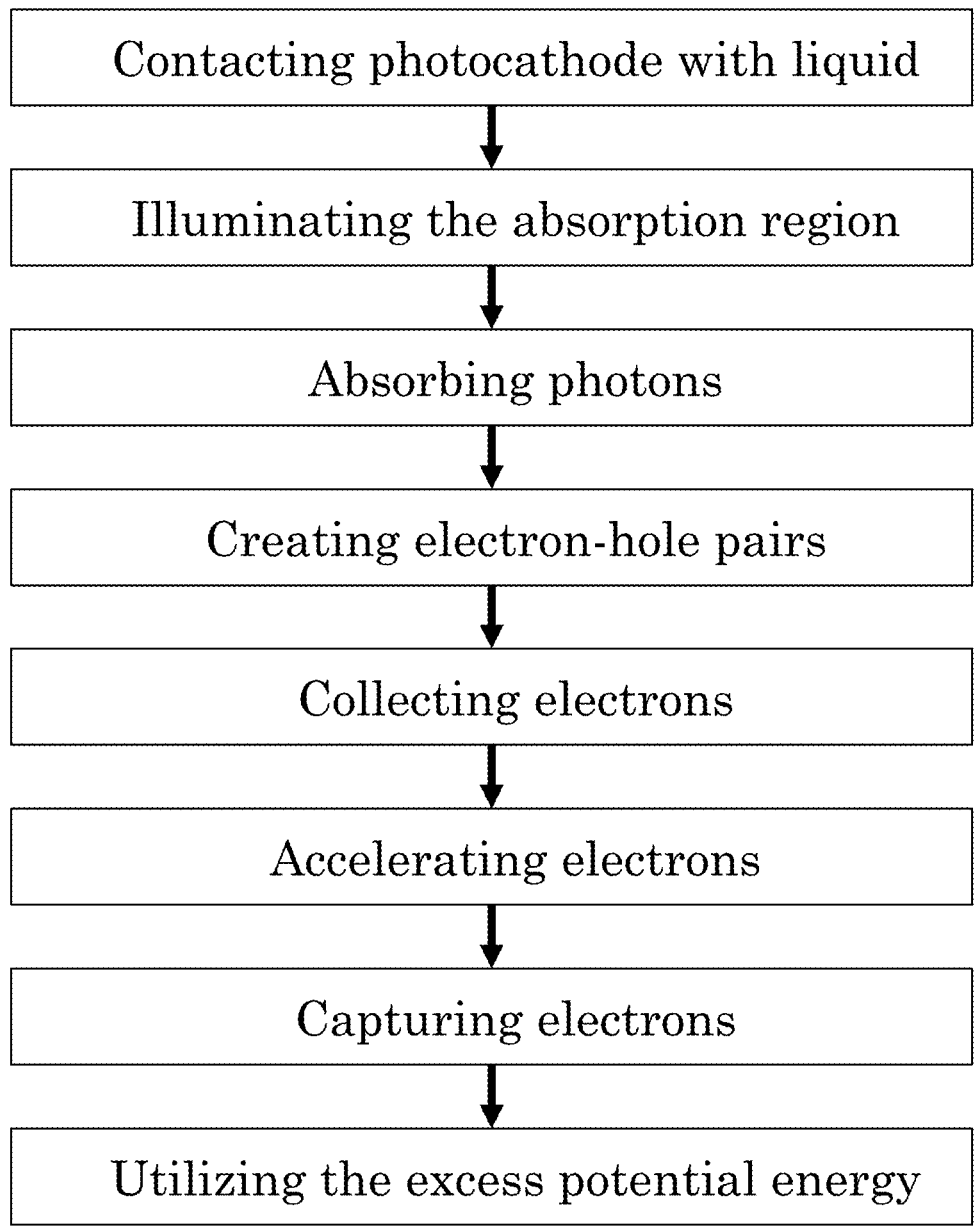
FIG. 19 is a flowchart illustrating how an embodiment may be used to drive an electrochemical reduction reaction.

FIG. 19 depicts a flowchart for a process that can be used to control an electrochemical reduction reaction in these types of applications. The process begins by contacting an embodiment of a photocathode with a liquid, and typically resulting in an embodiment of a system, e.g., the system disclosed in FIG. 5. The photocathode should have a contact, a light absorption region, an electron acceleration region, and an energy capture region. The liquid should be in contact with the photocathode at the energy capture region or at a co-catalyst, forming a photocathode-liquid junction. After contacting the photocathode with liquid, the light absorption region is illuminated with photons. The light absorption region absorbs the photons, and creates a plurality of electron-hole pairs in the light absorption region. The holes are collected by the contact, and the electrons move to the electron acceleration region. After reaching the electron acceleration region, the electrons are accelerated to a kinetic energy larger than the potential energy of the conduction band in an energy capture region. When the electrons enter the energy capture region, the electrons lose kinetic energy and thermalize to the conduction band minimum of the energy capture region. The potential energy, which is reflected in the conduction band offset between the electron acceleration region and energy capture region, is now incorporated within the electron distribution. This energy can be used to drive an electrochemical reduction reaction at the photocathode-liquid junction.

Using such a method, specific end-use applications could include: low power and recharging systems and next generation vehicles. The disclosed system and method can support hydrogen and higher-order hydrocarbon fuel generation for commercial, alternative energy applications. Applications would be portable fuel cell applications and transportation related power, which can have many military and civilian applications.

In some embodiments, the system is utilized with fuel cells to enable portable power, and transportation related power. Specifically, the ability to generate fuels on-site and store energy for later usage. Additionally, ammonia assists in food production and sterilization as well as being an alternative fuel source.

It should be emphasized that the above-described embodiments are merely possible examples of implementations. Many variations and modifications may be made to the above-described embodiments. All such modifications and variations are intended to be included herein within the scope of the disclosure and protected by the following claims Obviously, many modifications and variations of the present invention are possible in light of the above teachings.

All references listed herein are also part of the application and are incorporated by reference in their entirety as if fully set forth herein.

What is claimed:

1. A photocathode for producing hydrogen gas and hydrogen containing compounds from reactants within a liquid and supporting electrolytes which reduces the overpotential required to drive the reactions, the photocathode comprising:
   an electrical contact that collects carriers;
   a semiconducting region having a first total polarization vector $P_1$, and being operatively associated with the contact;
   a light absorption region adapted to create electron-hole pairs, the light absorption region being adjacent to the semiconducting region, forming a first interface with the semiconducting region, and having a second total polarization vector $P_2$ greater than or equal to $P_1$;
   an electron acceleration region adjacent to the light absorption region, the electron acceleration region having an electron acceleration region bandgap, the electron acceleration region forming a second interface with the light absorption region, the electron acceleration region having a third total polarization vector $P_3$ greater than the second total polarization vector $P_2$ such that a negative polarization charge is formed at the second interface which creates an electric field that is adapted to accelerate electrons within the electron acceleration region away from the second interface; and
   an energy capture region having a fourth total polarization vector $P_4$ adjacent to the electron acceleration region, the energy capture region forming a third interface with the electron acceleration region and having an energy capture region bandgap that is larger than the electron acceleration region bandgap such that the potential energy of the conduction band of the energy capture region is larger than the potential energy of the conduction band of the electron acceleration region, the interface charge at the third interface and the space charge in the energy capture region configured to form a junction between the liquid and the energy capture region that depletes the energy capture region of majority carriers such that the resulting electric field in the energy capture region directs electrons in the energy capture region toward the liquid;

whereby the photocathode is configured such that kinetic energy gained by the electrons in the electron acceleration region is captured as potential energy in the energy capture region so as to facilitate chemical reduction reactions.

2. The photocathode according to claim 1, wherein the second total polarization vector $P_2$ of the light absorption region is greater than the first total polarization vector $P_1$ of the semiconducting region, forming a negative polarization charge at the first interface and creating an electric field that depletes the light absorption region such that holes are collected by drift and diffusion at the contact and electrons are collected from the light absorption region by drift into the electron acceleration region.

3. The photocathode according to claim 1, wherein the second total polarization vector $P_2$ of the light absorption region is the same as the first total polarization vector $P_1$ of the semiconducting region, and the amount of doping of both the light absorption and the semiconducting regions is equal, forming a junction that is quasi-neutral such that holes are collected by diffusion at the contact and electrons are collected by diffusion at the interface of the light absorption region and the electron acceleration region.

4. The photocathode according to claim 1, wherein the liquid is comprised of three components: a solvent, reactants for the chemical reaction at the surface of the photocathode, and a supporting electrolyte salt.

5. The photocathode according to claim 1, further comprising a polar substrate with the direction of epitaxial growth forming an acute angle greater than or equal to zero with the [000$\bar{1}$] direction.

6. The photocathode according to claim 5, wherein the energy capture region has a fourth total polarization vector $P_4$ greater than the third total polarization vector $P_3$, forming a negative polarization charge at the third interface and creating an electric field that accelerates the electrons toward the liquid.

7. The photocathode according to claim 6, wherein the light absorption region is comprised of a II-VI alloy or III-Nitride alloy having an equal or larger bandgap than a bandgap of the semiconducting region, the alloy being suitable for light absorption of the solar spectrum;

wherein the electron acceleration region is comprised of a II-VI or III-Nitride alloy of larger bandgap than the light absorption region; and wherein the energy capture region is comprised of a II-VI or III-Nitride alloy with larger bandgap than the electron acceleration region.

8. The photocathode according to claim 5, wherein the semiconducting region is comprised of an alloy having a wurtzite hexagonal crystal structure, the alloy comprising either:

N with at least one element selected from the Group III elements consisting of In, Al and Ga (III-Nitride alloy); or at least one Group II element selected from the group consisting of Mg, Zn, Cd, with at least one Group VI element selected from the group consisting of O, S, Se, Te (II-VI alloy).

9. The photocathode according to claim 5, wherein the semiconducting region is doped p-type with a density of Mg atoms greater than or equal to $1\times10^{19}$ cm$^{-3}$ and the light absorption region, electron acceleration region, and energy capture region are doped p-type with a density of Mg atoms less than or equal to $1\times10^{19}$ cm$^{-3}$.

10. The photocathode according to claim 9, wherein the second total polarization vector $P_2$ of the light absorption region is the same as the first total polarization vector $P_1$ of the semiconducting region, and the doping of the semiconducting region is at a larger concentration than the doping of the light absorption region, forming a junction that has a depleted light absorption region adapted to sustain an electric field such that holes are collected by drift and diffusion at the contact and electrons are collected by drift at the interface of the light absorption region and the electron acceleration region in the electron acceleration region.

11. The photocathode according to claim 9, wherein the semiconducting region is comprised of $In_xGa_{1-x}N$ with a thickness in the range of 100 nm to 1000 nm and with x in the range of 0.2 to 0.22, the light absorption region is comprised of $In_{0.2}Ga_{0.8}N$ with a thickness in the range of 100 nm to 300 nm, the electron acceleration region is comprised of $In_{0.18}Ga_{0.82}N$ with a thickness in the range of 50 nm to 100 nm, and the energy capture region is comprised of $In_xGa_{1-x}N$ with x in the range of 0 to 0.16 and thickness in the range 5 nm to 100 nm.

12. The photocathode according to claim 9, wherein the polar substrate is doped p-type and the contact to the semiconducting region is formed through the polar substrate.

13. The photocathode according to claim 9, wherein the polar substrate is n-type GaN and the contact to the semiconducting region is formed through the polar substrate using a tunnel junction comprised of a GaN region adjacent to the n-type GaN substrate doped n-type with a density of Si atoms greater than $1\times10^{19}$ cm$^{-3}$, an InN region with thickness in the range of 1 to 3 nm, and the first semiconducting region doped p-type with a density of Mg atoms greater than $1\times10^{19}$ cm$^{-3}$.

14. The photocathode according to claim 5, wherein the semiconducting region has a free hole concentration greater than or equal to $1\times10^{17}$ cm$^{-3}$ and the light absorption region, electron acceleration region, and energy capture region each have free hole concentrations less than or equal to $1\times10^{18}$ cm$^{-3}$.

15. The photocathode according to claim 1, further comprising a polar substrate with the direction of epitaxial growth forming an acute angle greater than or equal to zero with the direction.

16. The photocathode according to claim 15, wherein the light absorption region is comprised of a II-VI or III-Nitride alloy having an equal or smaller bandgap than a bandgap of the semiconducting region, the alloy being suitable for absorption of the solar spectrum;

wherein the electron acceleration region is comprised of a II-VI or III-Nitride alloy of smaller bandgap than the light absorption region; and wherein the energy capture region is comprised of a II-VI or III-Nitride alloy with larger bandgap than the electron acceleration region.

17. The photocathode according to claim 15, wherein the semiconducting region is comprised of an alloy having a of wurtzite hexagonal crystal structure, the alloy comprising either:
N with at least one element selected from the Group III elements consisting of In, Al and Ga (III-Nitride alloy); or
at least one Group II element selected from the group consisting of Mg, Zn, Cd, with at least one Group VI element selected from the group consisting of O, S, Se, Te (II-VI alloy).

18. The photocathode according to claim 15, wherein the semiconducting region is doped p-type with a density of Mg atoms greater than or equal to $1\times10^{19}$ cm$^{-3}$;
wherein the light absorption region and electron acceleration region are doped p-type with a density of Mg atoms less than or equal to $1\times10^{19}$ cm$^{-3}$, and
wherein the energy capture region is doped p-type with a density of Mg atoms greater than or equal to $1\times10^{19}$ cm$^{-3}$ and has a thickness such that the charge distribution from the ionized acceptor dopant atoms compensates the sheet charge from the fourth total polarization vector $P_4$ which is less than the third total polarization vector $P_3$, forming a potential variation that allows carriers to move from the energy capture region to the liquid.

19. The photocathode according to claim 15, wherein the semiconducting region has a free hole concentration greater than or equal to $1\times10^{17}$ cm$^{-3}$;
wherein the light absorption region and electron acceleration region both have free hole concentrations less than or equal to $1\times10^{18}$ cm$^{-3}$, and
wherein the energy capture region has a free hole concentration greater than or equal to $1\times10^{17}$ cm$^{-3}$ and has a thickness such that the charge distribution from the ionized acceptor dopant atoms compensates the sheet charge from the fourth total polarization vector $P_4$ which is less than the third total polarization vector $P_3$, forming a potential variation that allows carriers to move from the energy capture region to the liquid.

20. The photocathode of claim 15, wherein the semiconducting region is comprised of $In_xGa_{1-x}N$ with x in the range of 0 to 0.2 and a thickness in the range of 100 nm to 1000 nm;
wherein the light absorption region is comprised of $In_{0.2}Ga_{0.8}N$ with a thickness in the range of 100 nm to 300 nm;
wherein the electron acceleration region is comprised of $In_{0.22}Ga_{0.78}N$ with a thickness in the range of 50 nm to 100 nm, and
wherein the energy capture region is comprised of $In_xGa_{1-x}N$ with x in the range of 0 to 0.18 and thickness in the range 10 nm to 100 nm.

21. The photocathode according to claim 15, wherein the polar substrate is doped p-type and the contact to the semiconducting region is formed through the polar substrate.

22. The photocathode according to claim 15, wherein the polar substrate is n-type GaN and the contact to the semiconducting region is formed through the polar substrate using
a tunnel junction comprised of a GaN region adjacent to the n-type GaN substrate doped n-type with a density of Si atoms greater than $1\times10^{19}$ cm$^{-3}$,
an AlN region with thickness in the range of 1 to 3 nm, and
the semiconducting region doped p-type with a density of Mg atoms greater than $1\times10^{21}$ cm$^{-3}$.

23. The photocathode according to claim 1, further comprising a co-catalyst.

24. A photoelectrolysis system comprising: the photocathode according to claim 1; and a counter electrode that serves as the anode for the counter-reaction.

25. A method of controlling an electrochemical reduction reaction, comprising the steps of:
contacting a photocathode having a contact, a semiconducting region, a light absorption region, an electron acceleration region, and an energy capture region, with a liquid, the liquid being in contact with the photocathode at a photocathode-liquid junction;
illuminating the light absorption region with a plurality of photons;
absorbing the plurality of photons in the light absorption region;
creating a plurality of electron-hole pairs in the light absorption region, collecting the holes with the contact, and moving the electrons from the light absorption region to the electron acceleration region;
accelerating the electrons entering the electron acceleration region to a kinetic energy larger than the potential energy of the conduction band offset at the interface between the electron acceleration region and the energy capture region;
capturing the electrons in the energy capture region and utilizing the additional potential energy of the captured electrons to drive a electrochemical reduction reaction at the photocathode-liquid junction.

* * * * *